(12) United States Patent
Carson et al.

(10) Patent No.: US 9,720,717 B2
(45) Date of Patent: Aug. 1, 2017

(54) VIRTUALIZATION SUPPORT FOR STORAGE DEVICES

(71) Applicant: SanDisk Technologies LLC, Plano, TX (US)

(72) Inventors: Neil Carson, Palo Alto, CA (US);
Nisha Talagala, Livermore, CA (US);
Mark Brinicombe, San Jose, CA (US);
Robert Wipfel, Draper, UT (US);
Anirudh Badam, Princeton, NJ (US);
David Nellans, Salt Lake City, UT (US)

(73) Assignee: SanDisk Technologies LLC, Plano, TX (US)

( * ) Notice: Subject to any disclaimer, the term of this patent is extended or adjusted under 35 U.S.C. 154(b) by 270 days.

(21) Appl. No.: 13/831,412

(22) Filed: Mar. 14, 2013

(65) Prior Publication Data
US 2014/0282514 A1 Sep. 18, 2014

(51) Int. Cl.
*G06F 9/455* (2006.01)

(52) U.S. Cl.
CPC .............. *G06F 9/45533* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,328,307 B2 | 2/2008 | Hoogterp | |
| 2005/0289312 A1* | 12/2005 | Ghosal | G06F 3/0611 711/167 |
| 2008/0005528 A1* | 1/2008 | Morris | 711/207 |
| 2009/0287902 A1* | 11/2009 | Fullerton et al. | 711/206 |
| 2010/0153617 A1* | 6/2010 | Miroshnichenko et al. | 711/6 |
| 2011/0082962 A1* | 4/2011 | Horovitz et al. | 711/6 |
| 2011/0154318 A1* | 6/2011 | Oshins et al. | 718/1 |
| 2011/0296133 A1* | 12/2011 | Flynn et al. | 711/171 |
| 2012/0011340 A1* | 1/2012 | Flynn et al. | 711/171 |
| 2012/0030408 A1* | 2/2012 | Flynn et al. | 711/102 |
| 2013/0139161 A1* | 5/2013 | Yamamoto | 718/1 |
| 2014/0258670 A1* | 9/2014 | Venkatasubramanian et al. | 711/171 |

* cited by examiner

*Primary Examiner* — Dong Kim
(74) *Attorney, Agent, or Firm* — Stoel Rives LLP

(57) ABSTRACT

Techniques are disclosed relating to enabling virtual machines to access data on a physical recording medium. In one embodiment, a computing system provides a logical address space for a storage device to an allocation agent that is executable to allocate the logical address space to a plurality of virtual machines having access to the storage device. In such an embodiment, the logical address space is larger than a physical address space of the storage device. The computing system may then process a storage request from one of the plurality of virtual machines. In some embodiments, the allocation agent is a hypervisor executing on the computing system. In some embodiments, the computing system tracks utilizations of the storage device by the plurality of virtual machines, and based on the utilizations, enforces a quality of service level associated with one or more of the plurality of virtual machines.

21 Claims, 16 Drawing Sheets

VIRTUALIZATION SUPPORT FOR STORAGE DEVICES

BACKGROUND

Technical Field

This disclosure relates generally to accessing data on a physical recording medium, and more specifically to enabling virtual machines to access data on the physical recording medium.

Description of the Related Art

Modern computing systems may execute software (called a virtual machine) that emulates computer hardware capable of running applications. Virtual machines may be advantageous in that they can allow multiple system platforms to be implemented using the same underlying physical hardware. They can also serve as an effective way to distribute a computing system's resources among multiple applications. Usage of Virtual machines can also improve system reliability as they can isolate executing applications from underlying hardware.

Virtual machines typically run on a hypervisor (also called a virtual machine manager (VMM)) that manages allocation of computing system resources among the virtual machines. A computing system may implement support for a hypervisor either natively or as host. In a native implementation (also called a bare metal implementation), hardware provides direct support for executing a hypervisor. This particular implementation can be advantageous because it typically can run virtual machines more efficiently. In contrast, in a host implementation, the hypervisor runs on an underlying operation system. This particular implementation can be advantageous because underlying hardware does not have to provide any hypervisor support.

SUMMARY

The present disclosure describes embodiments in which a storage device is shared among multiple virtual machines.

In one embodiment, a method is disclosed that includes a computing system providing a logical address space for a storage device to an allocation agent that is executable to allocate the logical address space to a plurality of virtual machines having access to the storage device. In such an embodiment, the logical address space is larger than a physical address space of the storage device. The method further includes the computing system processing a storage request from one of the plurality of virtual machines. In such an embodiment, the storage request specifies a logical address within the logical address space.

In another embodiment, an apparatus is disclosed that includes an allocation module, a storage module, and a translation module. The allocation module is configured to allocate at least a portion of a logical address space for a storage device to a plurality of virtual machines managed by a hypervisor. The logical address space is larger than a physical address space of the storage device. The allocation module is configured to allocate the portion by segregating the portion between the virtual machines. The storage module is configured to process a storage request received directly from a virtual machine such that the storage request specifies a logical address determined by the virtual machine. The logical address is also from the allocated portion. The translation module is configured to translate the logical address to a physical address within the storage device.

In still another embodiment, a non-transitory computer readable medium has program instructions stored thereon. The program instructions are executable by a computing system to cause the computing system to perform operations. The operations include configuring a storage device such the storage device has a logical address space that is larger than a physical address space of the storage device. The operations further include servicing requests for the storage device from a plurality of virtual machines allocated respective portions of the logical address space.

In yet another embodiment, an apparatus is disclosed that includes a first means and a second means. The first means is for storing data using a log-structure and has a physical address space. The second means is for presenting a logical address space of the first means to a hypervisor that is executable to allocate the logical address space to a plurality of virtual machines having access to the first means. In such an embodiment, the logical address space is larger than the physical address space.

Figure 1:
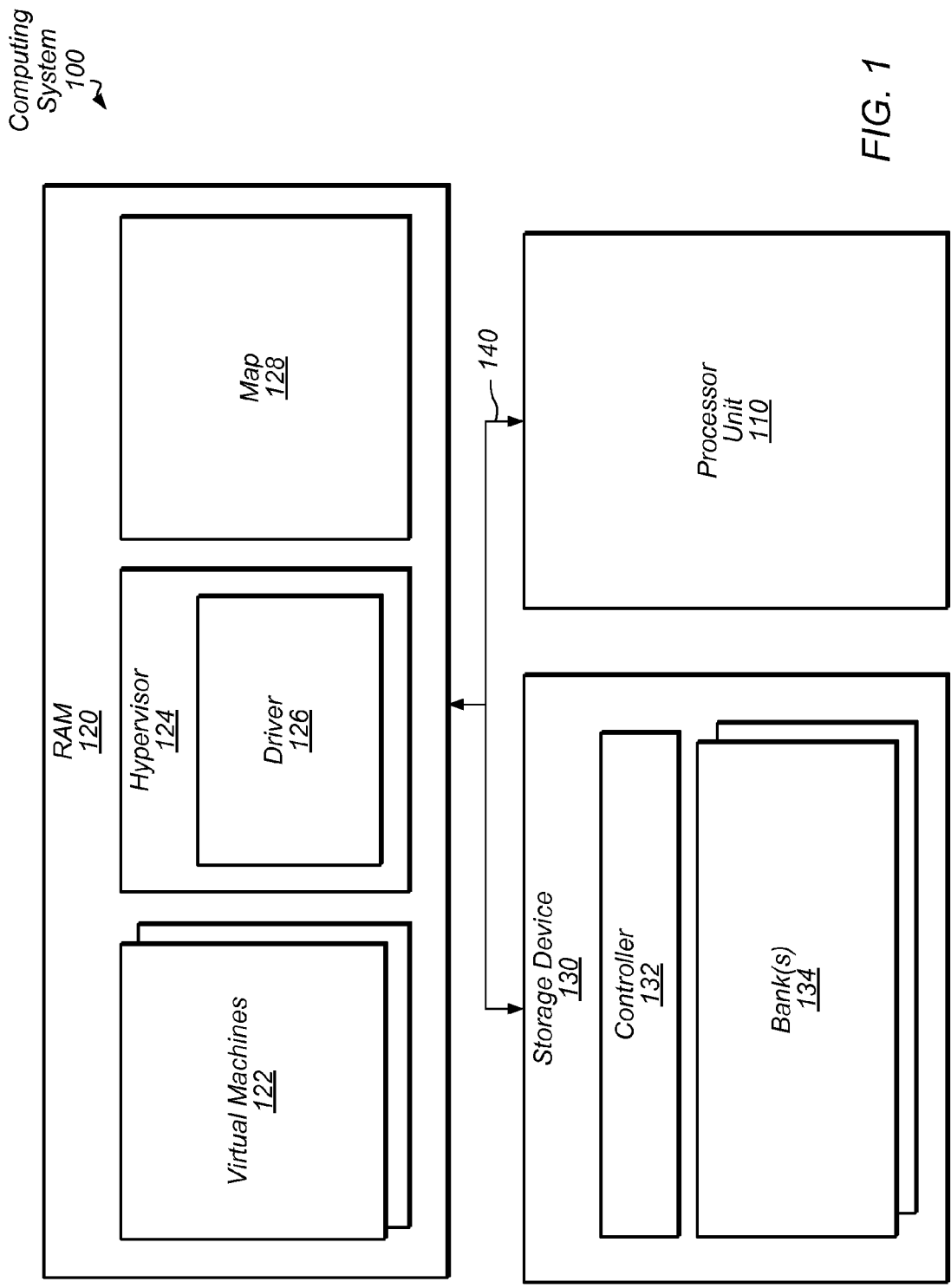
FIG. 1 is a block diagram illustrating one embodiment of a computing system that shares a storage device among a set of virtual machines.

The disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure also includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in a manner that is capable of performing the task(s) at issue. Reciting that a unit/circuit/component is "configured to" perform one or more tasks is expressly intended not to invoke 35 U.S.C. §112, sixth paragraph, for that unit/circuit/component.

DETAILED DESCRIPTION

Figure 2:
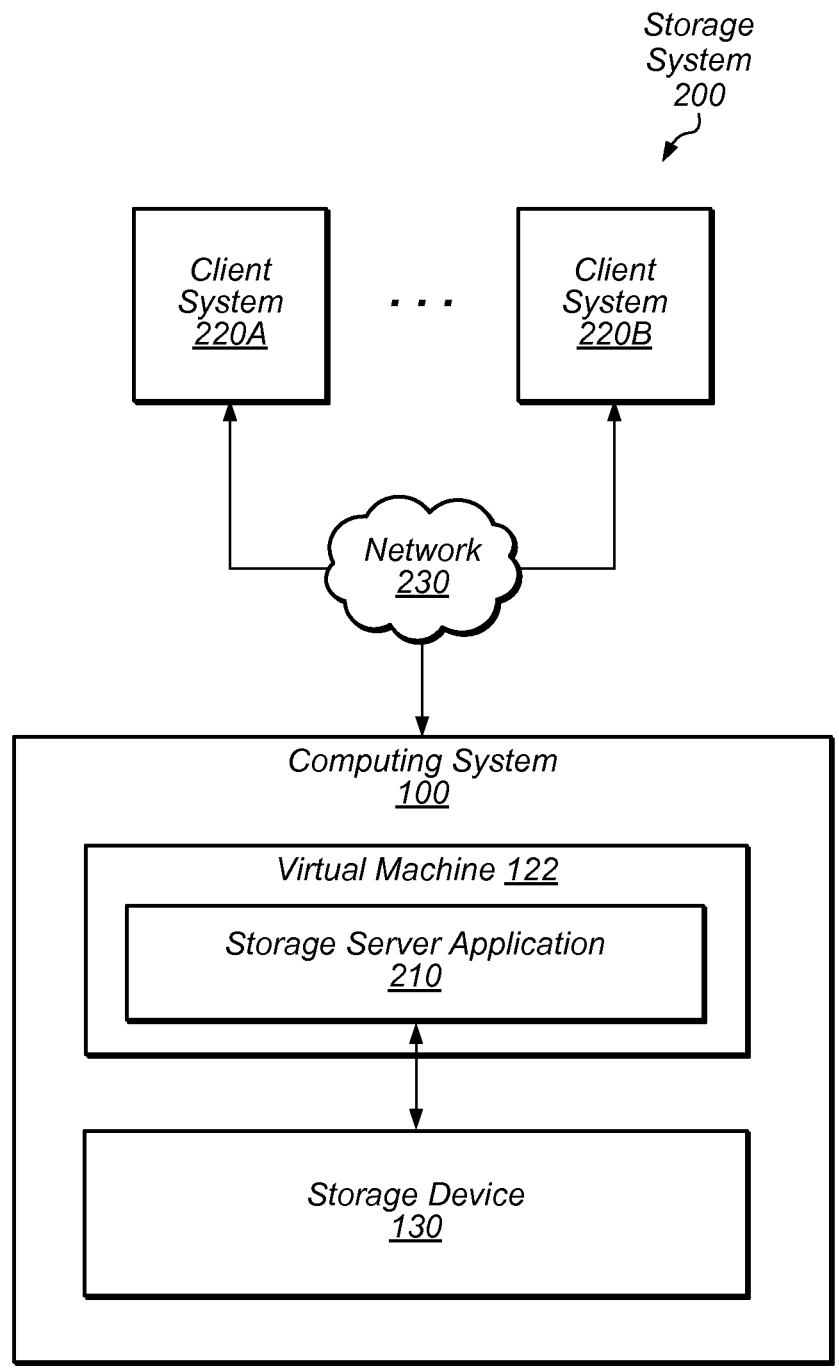
FIG. 2 is a block diagram illustrating one embodiment of a storage system including the computing system.

The disclosure initially describes, with reference to FIGS. 1 and 2, a computing system that shares a storage device among a set of virtual machines. To facilitate this description, logical and physical address spaces associated with the storage device are described with reference to FIGS. 3A-3C. A map structure usable to access data within the storage device is described with reference to FIGS. 4A and 4B. Embodiments in which a logical address space of the storage device is allocated among a set of virtual machines are described in further detail with reference to FIGS. 5-11B.

Turning now to FIG. 1, a block diagram of computing system 100 that supports execution of virtual machines is depicted. Computing system 100 may be any suitable type of computing device such as a server, laptop, desktop, a mobile device, etc. In some embodiments, computing system 100 may include multiple computing devices working together. For example, in one embodiment, computing system 100 may be multiple servers coupled together at a data center configured to store data on behalf of multiple clients, such as the storage system discussed below in conjunction with FIG. 2. In the illustrated embodiment, computing system 100 includes a processor unit 110, random access memory (RAM) 120, and storage device 130 coupled together via an interconnect 140. As shown, RAM 120 may include program instructions for one or more virtual machines 122 and a hypervisor 124 executable by processor unit 110. RAM 120 may also include a map 128. Hypervisor 124 may include a driver 126 for storage device 130, which, in turn, may include a controller 132 and one or more storage banks 134.

In various embodiments, driver 126 is described as having various functionality. This functionality may be implemented in software, hardware or a combination thereof. Further, such functionality may be implemented by software outside of hypervisor 124—e.g., as an application within a virtual machine 122, in one embodiment. In another embodiment, this functionality may be implemented by software stored within a memory of controller 132 and executed by a processor of controller 132. In still another embodiment, controller 132 may include dedicated circuitry to implement functionality of driver 126. In sum, the depiction of driver 126 as being implemented in software within hypervisor 124 should not be seen as limiting, but rather as a depiction of an exemplary embodiment.

Storage device 130 is representative of any physical medium upon which data can be recorded. As used herein, the term "recorded" refers broadly to the process of an electronic computing device storing, writing or otherwise transferring one or more data values on to some physical recording medium for subsequent use. Accordingly, a "physical recording medium" is used herein to refer to any medium on which data may be recorded by an electronic computing device. Further, the terms "storage" and "memory" are used herein to be synonymous with "physical recording medium." Given this broad definition, the designations memory (when referring to RAM 120) and storage (when referring to storage device 130) in FIG. 1 and elsewhere in this disclosure may refer to volatile and/or non-volatile media. Such media may also be referred to herein as "memory," and portions of such media may be referred to as "blocks," "cells," "storage blocks," "memory blocks," etc. Collectively, a group of these blocks may be referred to as a "storage array," "memory array," etc.

References in this disclosure to "accessing" data in storage device 130 refers to any type of transaction, including writing data to storage device 130 and/or reading data from storage device 130, as well as, TRIM operations, maintenance accesses, discovery accesses, load and store operations under memory semantics, and the like. Further, given the broad definitions of "storage" and "memory" referred to above, these accesses may be applicable to a storage device that has non-volatile memory and/or volatile components.

In some embodiments, storage device 130 may be implemented such that it includes non-volatile memory. Accordingly, in such an embodiment, storage banks 134 may include non-volatile storage devices such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc.

In some embodiments, storage device 130 may be implemented such that it includes non-volatile solid-state memory. Accordingly, in such an embodiment, storage banks 134 may include any suitable type of solid-state storage media including, but not limited to, NAND flash memory, NOR flash memory, nano RAM ("NRAM"), magneto-resistive RAM ("MRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), etc. In some embodiments, storage banks 134 may include multiple, different types of solid-state storage media.

In other embodiments, storage device 130 may be implemented such that it includes volatile memory. Storage banks 134 may thus correspond to any suitable volatile memory including, but not limited to such as RAM, dynamic RAM (DRAM), static RAM (SRAM), synchronous dynamic RAM (SDRAM), etc. Although shown independently of processor unit 110, in some embodiments, storage device 130 may correspond to memory within processor unit 110 such as one or more cache levels (e.g., L1, L2, L3, etc.) within processor unit 110.

In sum, various functionality will be described herein pertaining to storage device 130. Such functionality may be applicable to any suitable form of memory including both non-volatile and volatile forms. Thus, while particular embodiments of driver 126 are described herein within the context of non-volatile solid-state memory arrays, driver 126 may also be applicable to other recording media such as volatile memories and other types of non-volatile memories, particularly those that include a reclamation process.

Controller 132, in one embodiment, is configured to manage operation of storage device 130. Accordingly, controller 132 may facilitate performance of read operations at specified addresses (e.g., "physical addresses" as discussed below) including selecting the appropriate banks 134 and accessing the data within the appropriate cells within those banks Controller 132 may facilitate performance of write operations including programming of particular cells. Controller 132 may also perform preparation operations to permit subsequent writes to storage device 130 such as, in one embodiment, erasing blocks of cells for subsequent reuse. (The cycle of programming and erasing a block of cells may be referred to as a "PE cycle.") In some embodiments, controller 132 implements separate read and write data pipelines to perform read and write operations in parallel. In one embodiment, controller 132 is also configured to communicate with driver 126 (discussed below) over interconnect 140. For example, in some embodiments, controller 132 communicates information for read and write operations via direct memory access (DMA) transactions coordinated by a DMA controller. Accordingly, controller 132 may support any suitable interconnect type such as a peripheral component interconnect (PCI), PCI express (PCI-e), serial advanced technology attachment ("serial ATA" or "SATA"), parallel ATA ("PATA"), small computer system interface ("SCSI"), IEEE 1394 ("FireWire"), Fiber Channel, universal serial bus ("USB"), etc. In some embodiments, controller 132 may also perform other operations such as error checking, data compression, encryption and decryption, packet assembly and disassembly, etc.

In various embodiments, storage device 130 is organized as a log-structured storage. As used herein, the term "log structure" refers to an arrangement of data on a storage medium in which an append point is used to determine where data is stored; the append point is advanced sequentially through an "address space" as data is stored. A log-structured storage is simply a storage device that is organized using a log structure. The use of a log structure also connotes that metadata is stored in conjunction with the data in order to permit the storage device 130 to be restored to a previous state (i.e., a "log checkpoint"). Such a restoration may be performed, for example, to facilitate crash recovery in the event of power loss, to recover a last known valid state in the event of data corruption, etc. As used herein, the term "address space" refers to a range of addresses that can be used to specify data within a storage device. As will be described below, a log-structured storage may have both logical and physical address spaces. The term "logical address space" refers to an address space as perceived by higher-level processes even though this address space may not be representative of how data is actually organized on the physical media of storage device 130 or the actual number of physical address locations actually in use, reserved, or allocated to a higher-level process. In contrast, the term "physical address space" refers to the address space used by lower-level processes and may be indicative of how data is organized on the physical media of storage device 130 and the actual number of physical address locations in use by a higher-level process. Embodiments of logical and physical address spaces are discussed in further detail in conjunction with FIGS. 3A and 3B, respectively. One embodiment of a log structure is discussed in conjunction with FIG. 3C.

In various embodiments, using a log structure may permit multiple instances of a set of data to be present in storage device 130 as the data is written, modified, and rewritten to storage. As part of tracking data in a physical address space, older instances of stored data (i.e., those instances that are not the current instance) may be indicated as invalid. For example, in one embodiment, when a value is to be updated, the value may be written at a storage block specified by the current append point (rather than at the location where the value was previously stored). In response to the write being successfully performed, any previously stored instances of that value may be marked as invalid. As used herein, the term "invalid" refers to data that no longer needs to be stored by the system (e.g., because a newer copy of the data exists). Similarly, the term "invalidating" refers to the marking of data as invalid (e.g., storing a record in a data structure).

Map 128, in one embodiment, is used to map (i.e., translate) logical addresses to physical addresses within storage device 130. Accordingly, as data becomes moved and invalidated, it may reside in different physical addresses on storage device 130 over time. Through the use of map 128, however, an application may be able access a most recent set of data by specifying the same logical address (e.g., LBA) even though two or more versions of the data may reside in different physical addresses. Map 128 may be implemented using any suitable data structure. According, in one embodiment, map 128 is a binary-tree data structure. In others embodiments, map 128 may be an array, a linked list, a hash table, etc. In some embodiments, map 128 may be implemented using multiple data structures. One embodiment of map 128 is described in further detail below in conjunction with FIGS. 4A and 4B.

Virtual machines 122, in one embodiment, are executable to emulate computing systems that, in turn, execute program instructions. Accordingly, in some embodiments, a virtual machine 122 may execute a guest host and one or more applications. In other embodiments, a virtual machine 122 may execute applications without the aid of a guest OS. Virtual machines 122 may support the same or different platforms (e.g., a WINDOWS platform and an OSX platform). As will be described below, virtual machines 122 may utilize various hardware of computing system such as processor unit 110, RAM 120, and storage device 130.

Hypervisor 124, in one embodiment, is executable to manage allocation of computing system 100's resources among virtual machines 122. Accordingly, hypervisor 124 may allocate portions of storage device 130 and/or portions of RAM 120 to virtual machines 122; hypervisor 124 may also schedule execution times for virtual machines 122 on processor unit 110. To facilitate management, hypervisor 124 may track various metrics to ensure that an execution of one virtual machine 122 does not adversely affect execution of other virtual machines 122. For example, hypervisor 124 may be executable to monitor I/O requests of virtual machines to storage to ensure that collisions do not occur (i.e., the situation in which two virtual machines write to the same address resulting in data for one of the virtual machines becoming corrupted). In some embodiments, hypervisor 124 may also perform various control operations such as instantiating and killing virtual machines 122, suspend and resuming virtual machines 122, cloning virtual machines 122, etc. Computing system 100 may provide native support for hypervisor 124 or execute hypervisor 124 on an underlying host operating system. In some embodiments, hypervisor 124 may correspond to VMWARE'S ESX, MICROSOFT'S HYPER-V, etc.

Driver 126, in one embodiment, is executable to permit virtual machines 122 and hypervisor 124 to interact with storage device 130. Accordingly, driver 126 may receive requests to perform read and write operations at specified logical block addresses and may issue corresponding commands to controller 132 to implement those operations. In some embodiments, driver 126 manages garbage collection for storage device 130 to reclaim storage blocks with invalid data. As used herein, "reclaiming" a storage block or "reclamation" of a storage block refers to preparing the storage block for reuse (i.e., so that the storage block can store new data). In the case of flash media, reclamation may include copying valid data out of the storage block and erasing the block. In some embodiments, to facilitate performance of read and write operations, driver 126 also maps logical addresses (e.g., LBAs) to corresponding physical addresses (in other embodiments, mapping logical addresses to physical addresses may be performed elsewhere, such as at controller 132). Accordingly, driver 126 may also manage map 128 including adding and removing translations from map 128 as data is manipulated on storage device 130.

In various embodiments, driver 126 presents a logical address space to hypervisor 124, which divides the space into portions and distributes them among virtual machines 122. In one embodiment, the size of the logical address space may be equivalent to the size of the physical address space on storage device 130. For example, if storage device 130 has a 1.2 TB capacity addressable using a 32-bit physical address space, driver 126 may present a 32-bit logical address space to hypervisor 124. If the hypervisor 124 supports four virtual machines 122, hypervisor 124 may allocate each one an address range (e.g., a range of LBAs) corresponding to a 300 GB allocation of storage device 130. In another embodiment, driver 126 presents a logical address space to hypervisor 124 that is larger than the physical address space of storage device 130. In such an embodiment, virtual machines 122 may be described as being "thinly provisioned" as they are given more resources (e.g., storage capacity) than actually exists—thus, virtual machines 122 cannot collectively consume the entire logical address space (without adding additional capacity) as this would overload the storage capacity of storage device 130. Still further, in other embodiments, driver 126 may provide a logical address space that is significantly larger than the physical address space of a storage device such that the logical address space is a "sparse address space." (For the purposes of this disclosure, a sparse address space is any logical address space that is at least 10% larger than the physical address space of a storage device.) For example, in one embodiment, driver 126 may present a 48-bit sparse address space relative to a 32-bit physical address space. In such an embodiment, a given virtual machine 122 may consume considerably less than its total allocated LBA range such that considerable unused portions of logical address space may exist between one virtual machine 122's stored data and another virtual machines 122's data.

Driver 126 may determine the size of the logical address space to be presented based on any suitable criteria. In some embodiments, the size of the logical address space is determined based on a maximum number of virtual machines 122 to be supported by hypervisor 124 (which, in one embodiment, specifies the number of virtual machines 122 to driver 126 during configuration of storage device 130). Accordingly, in one embodiment, driver 122 may multiply the number of supported virtual machines by the size of the addressable physical address space (i.e., the number of addresses within the physical address space) to determine the size of the logical address space. Thus, for example, if storage device 130 has a 32-bit physical address space and hypervisor 124 is supporting four virtual machines, driver 126 may present a 34-bit logical address space to hypervisor 124 such that each virtual machine 122 is allocated a respective 32-bit addressable portion. In such an embodiment, the logical address space may be allocated based on the higher order bits in an address. Accordingly, in the example above, the two highest order bits (i.e., bits 34 and 33) may used to distinguish one virtual machine's allocated address range from another. In other words, an initial virtual machine VM1 may submit requests specifying the higher order bits 00 (i.e., the bits 00 would be appended to a 32-bit address to make a 34-bit address), another virtual machine VM 2 may submit requests specifying the higher order bits 01, and so on. As discussed below with respect to FIG. 6A, in some embodiments, higher order address bits may be determined based on an identifier of a virtual machine. In another embodiment, driver 126 may determine the logical address space based on the size of virtual memory supported by a guest OS in a virtual machine 122 (as discussed with respect to FIG. 9). Still, in other embodiments, driver 126 may provide a logical address space based on a user-specified parameter independent of the number of supported virtual machines 122.

In various embodiments, allocating ranges of a larger logical address space may be advantageous because it reduces the possibility of collisions within the logical address space (e.g., two virtual machines 122 inadvertently accessing the same LBA). Allocated ranges may also be static, continuous, and non-overlapping to reduce the possibility of collisions. Still further, through the usage of map 128, driver 126 may reduce the possibility of collisions within the physical address space without relying on hypervisor 124 to prevent potential collisions. As a result, in various embodiments, hypervisor 124's ability to monitor I/O requests for collision prevention can be disabled, reducing the cost of traversing the I/O stack from an application executing in a virtual machine 122 to storage device 130. (As used herein, the term "I/O stack" refers to the layers traversed by a data request as it is processed by an operating system into a form usable by a storage device. An I/O stack may include, for example, a file system layer, virtual memory layer, a driver layer, etc.)

In various embodiments, reducing hypervisor 124's involvement may enable driver 126 to interact directly with virtual machines 122 though, for example, single root I/O virtualization (SR-IOV). Accordingly, in such an embodiment, driver 126 may be executable to support one or more virtual functions usable by virtual machines 122 to submit I/O requests to storage device 130 without brokering from hypervisor 124. In many instances, support of direct interfacing with driver 126 may further reduce I/O stack traversal costs.

In some embodiments, driver 126's support of a larger logical address space enables it to further support various additional capacities. As will be described with respect to FIG. 7, in one embodiment, driver 126 may use the logical address space to enforce one or more quality of service (QoS) levels for virtual machines 122 accessing storage device 130. As will be described with respect to FIG. 8, in one embodiment, driver 126 facilitates virtual machine mobility (e.g., instantiating virtual machine clones, creating snapshots, offloading virtual machines 122 to other computing systems, etc.) through the use of a larger logical address space. As will be described with respect to FIG. 9, in one embodiment, driver 126 enables guest operating systems within virtual machines 122 to directly manage their respective swap spaces (i.e., to evict and load virtual memory pages from storage device 130 without using the paging capabilities of hypervisor 124).

Turning now to FIG. 2, a block diagram of a storage system 200 including computing system 100 is depicted. As discussed above, computing system 100 may include one or more virtual machines 122 that operate on data stored in storage device 130. In the illustrated embodiment, computing system 100 executes a storage server application 210 within a virtual machine 122 to enable client systems 220A and 220B to access and store data in storage device 130 via network 230. For example, in one embodiment, storage system 200 may be associated within an enterprise environment in which server application 210 distributes enterprise data from storage device 130 to clients 220. In some embodiments, clients 220 may execute other server applications such as web servers, mail servers, virtual private network (VPN) servers, etc. to further distribute data to other computing systems. Accordingly, in some embodiments, storage server application 210 may implement various network attached storage (NAS) protocols such as the file transfer protocol (FTP), network file system (NFS) protocol, server message block (SMB) protocol, Apple file protocol (AFP), etc. In some embodiments, computing system 100 may be one of several computing systems 100 configured to implement a storage area network (SAN).

Figure 3A:
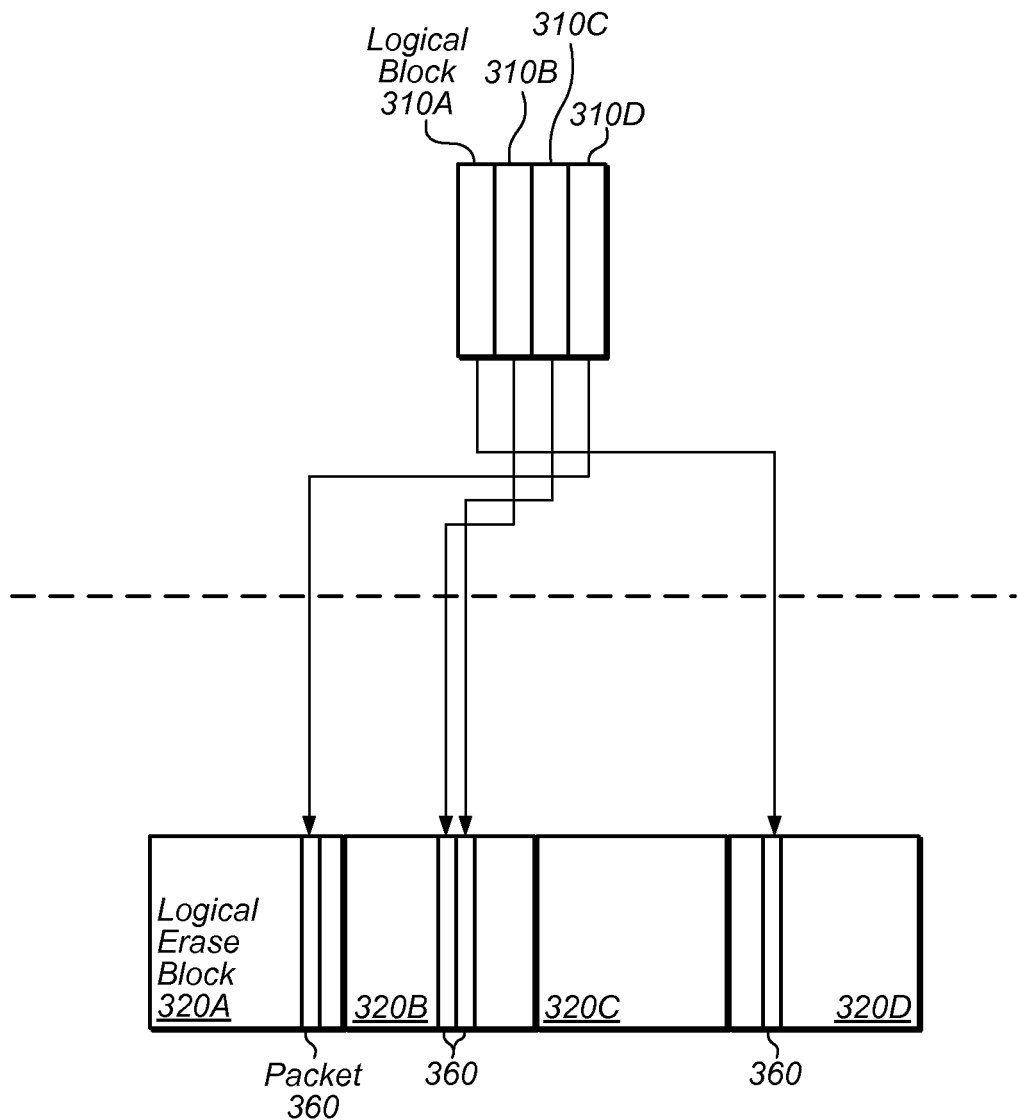
FIGS. 3A-3C are block diagrams illustrating embodiments of logical and physical address spaces.

Turning now to FIG. 3A, an exemplary mapping of a logical address space 302 to a physical address space 304 is depicted. In one embodiment, logical address space 302 represents the organization of data as perceived by higher-level processes such as virtual machines 122 and hypervisor 124. In one embodiment, physical address space 304 represents the organization of data on the physical media.

Logical address space 302, in one embodiment, is divided into logical addresses corresponding to respective logical blocks 310A-310D (also referred to as sectors). In some embodiments, the logical addresses are LBAs (in other embodiments, the logical addresses may correspond to some other form of logical identifiers). In one embodiment, sectors/blocks 310 represent the smallest block of data associated with a given logical address. As but one example, a block 310 may be approximately 512 bytes in size (while logical erase blocks and logical pages discussed below may be approximately 40 MB and 8 kB, respectively).

Physical address space 304, in one embodiment, is divided into physical addresses corresponding to the arrangement of data on the physical recoding media. As will be discussed in further detail with respect to FIG. 3B, in one embodiment, the content of logical blocks 310 may be stored as packets 360 within logical erase blocks 320. As discussed with respect to FIG. 3C, in various embodiments, physical address space 304 may be organized as a log structure, in which write operations may be performed at only one or more append points.

Figure 3B:
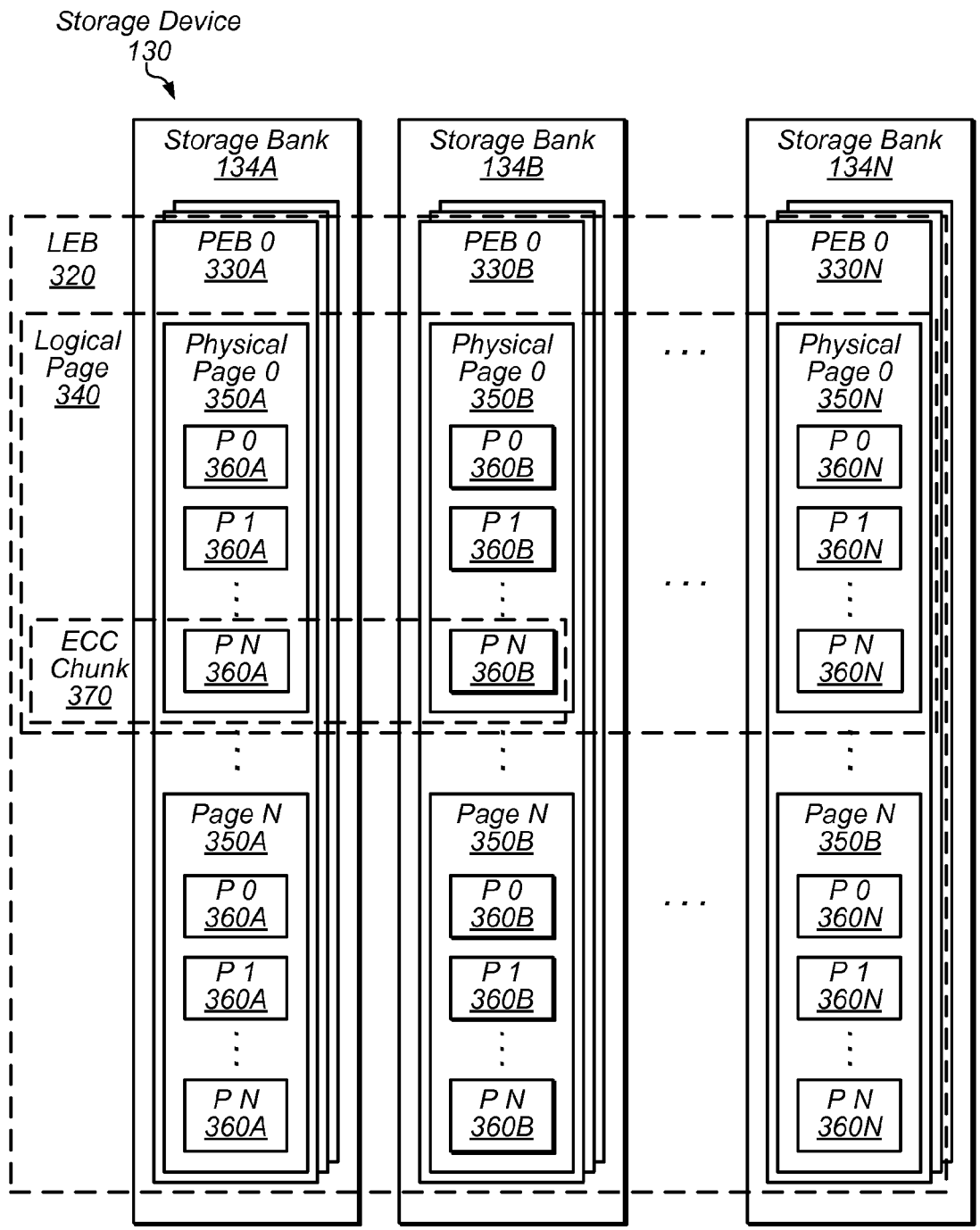

Turning now to FIG. 3B, a block diagram of storage blocks within storage device 130 is depicted. In the illustrated embodiment, storage device 130 is organized into logical erase blocks (LEBs) 320 that include multiple physical erase blocks (PEBs) 330, which are located in separate storage banks 134. A logical erase block 320 is further divided into multiple logical pages 340 (not to be confused with virtual memory pages discussed below with respect to FIG. 9) that, in turn, include multiple physical pages 350. Pages 350 include multiple packets 360, which may be grouped into ECC chunks 370.

As used herein, the term "erase block" refers broadly to a logical erase block or a physical erase block. In one embodiment, a physical erase block 330 represent the smallest storage block with a given bank 134 that can be erased at a given time (e.g., due to the wiring of cells on the die). In one embodiment, logical erase blocks 320 represent the smallest block erasable by controller 132 in response to receiving an erase command. In such an embodiment, when controller 132 receives an erase command specifying a particular logical erase block 320, controller 132 may erase each physical erase block 330 within the block 320 simultaneously. It is noted that physical erase blocks 330 within a given logical erase block 320 (e.g., blocks 330A and 330B) may be considered as contiguous in physical address space 304 even though they reside in separate banks 134. Thus, the term "contiguous" may be applicable not only to data stored within the same physical medium, but also to data stored within separate media.

In one embodiment, a physical page 350 represents the smallest storage block within a given bank 134 that can be written to at a given time. In one embodiment, a logical page 340 is the smallest writable storage block supported by controller 132. (In one embodiment, controller 132 may include a buffer configured to store up to a logical page worth of data; upon filling the buffer, controller 132 may write the contents of the buffer to a single logical page simultaneously.) In some instances, dividing a logical page 340 across multiple banks 134 may result in faster access times for a set of data when multiple banks 134 are accessed in parallel.

In one embodiment, a packet 360 represents the smallest storage block within a given bank 134 that can be read at a given time. In one embodiment, an ECC chunk 370 is the smallest storage block readable by controller 132. In some embodiments, packets 360 may be slightly larger than logical blocks 310 as they may include the contents of a logical block 310 (or multiple blocks 310 in some instances) as well as a packet header.

In some embodiments, driver 126 may associate metadata with one or more of storage blocks 320-370. As used herein, the term "metadata" refers to system data usable to facilitate operation of solid-state storage device 130; metadata stands in contrast to, for example, data produced by an applications (i.e., "application data") or forms of data that would be considered by an operating system as "user data." For example, in one embodiment, a logical erase block 320 may include metadata specifying, without limitation, usage statistics (e.g., the number of program erase cycles performed on that block 320), health statistics (e.g., a value indicative of how often corrupted data has been read from that block 320), security or access control parameters, sequence information (e.g., a sequence indicator), a persistent metadata flag (e.g., indicating inclusion in an atomic storage operation), a transaction identifier, or the like. In some embodiments, a logical erase block 320 includes metadata identifying the VSUs 310 for which it stores packets as well as the respective numbers of stored packet for each VSU 310. In one embodiment, the header within a packet 360 may include packet metadata such as one or more LBAs associated with the contained data, the packet size, linkages to other packets, error correction checksums, etc. In various embodiments, driver 126 may use this information, along with other forms of metadata, to manage operation of storage device 130. For example, driver 126 might use this information to facilitate performance of read and write operations, recover storage device 130 to a previous state (including, for example, reconstruction of various data structures used by driver and/or replaying a sequence of storage operations performed on storage device 130), etc.

Figure 3C:
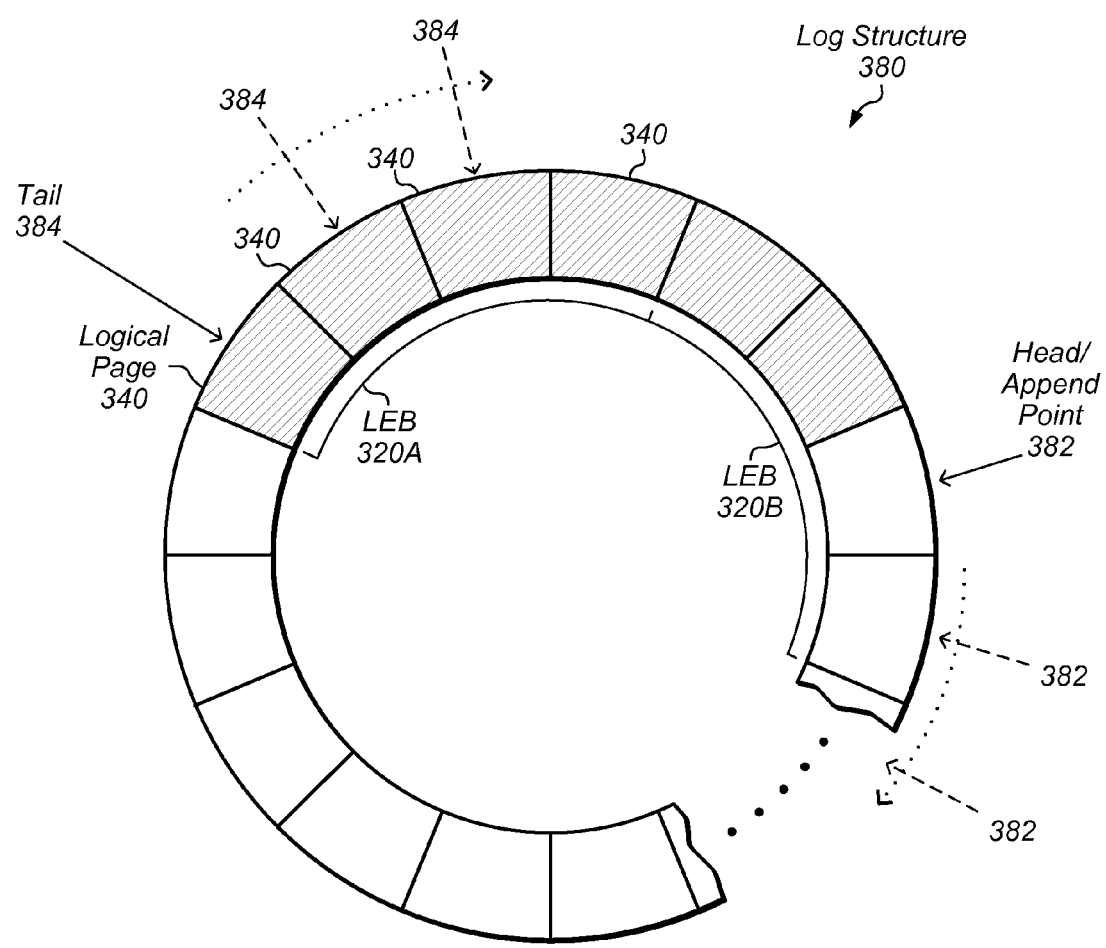

Turning now to FIG. 3C, a block diagram of log structure 380 within physical address space 304 is depicted. As shown, in various embodiments, data is stored sequentially at an append point 382 (also referred to as the "head") that starts an initial logical page 340. As additional data is stored, append point 382 advances to subsequent pages 340 in log structure 380. Eventually, after storing enough data, the append point 382 reaches the "last" page 340 in storage device 130, at which point the append point 382 wraps back to the initial page 340. Thus, log structure 380 is depicted as a loop/cycle. As more data is stored, the number of available pages 340 (shown as unshaded pages 340) decreases and the number of used pages 340 (shown as shaded pages 340) increases. As discussed above, in order to reuse these pages 340 (i.e., make them available to receive further writes), in one embodiment, driver 126 performs erase operations on logical erase blocks 320. In one embodiment, a tail 384 is maintained to identify the oldest page 340 still in use within structure 380 (pages other than the one located at the tail are considered to be younger than the tail). When the logical erase block 320 with the oldest page 340 is eventually erased, tail 384 is advanced forward to the next oldest page 340 in use at the end of log structure 380.

In general, data that is modified less frequently than other data in storage device 130 will migrate towards tail 384 (such data may be described as having a "colder temperature" or simply as "cold data"). On the other hand, data that is modified more frequently (described as having a "hotter temperature" or as "hot" data) will typically be located closer to head 382. Thus, valid data located in LEB 320A is likely "colder" than data in LEB 320B.

It is noted that, in other embodiments, storage device 130 may organized in a non-log-structured format.

Figure 4A:
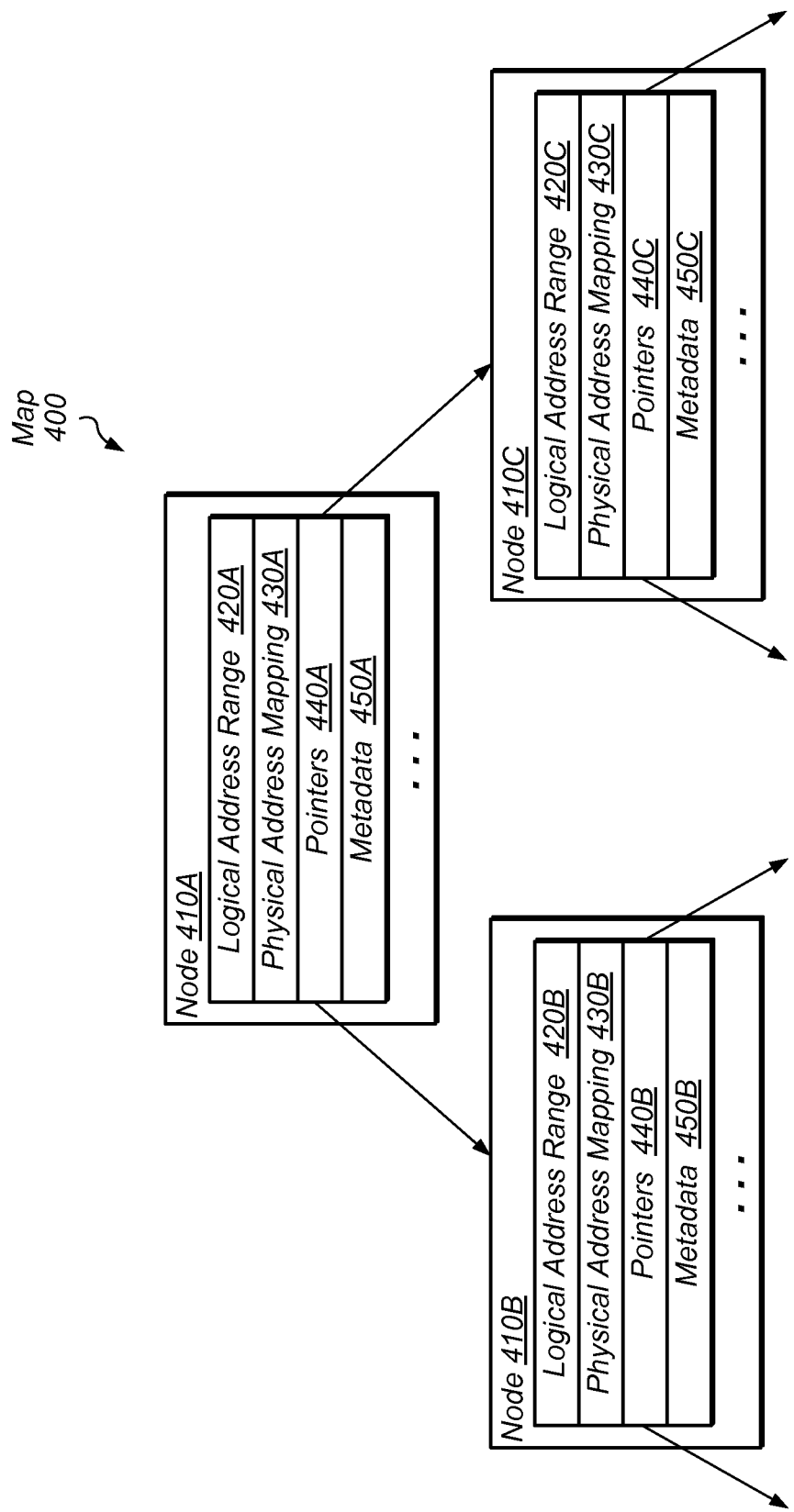
FIG. 4A is a block diagram illustrating one embodiment of a map data structure for translating a logical address to a corresponding physical address in a storage device.

Turning now to FIG. 4A, a block diagram of map 128 is depicted. In illustrated embodiment, map 128 is an extended-range b-tree that includes multiple nodes 410A-C. As shown, each node 410 includes a logical address range 420, a physical address mapping 430, one or more pointers 440, and additional metadata 450.

Logical address range 420, in one embodiment, is the range of logical addresses (e.g., LBAs) that are mapped using information within a given node 410. Accordingly, logical address range 420A specifies that physical address mapping 430A pertains to LBAs 50-100, for example. If a logical address does not "hit" in a node 410 (i.e., does not fall with in a range 420 of a node such as range 420A in root node 410A), then map 128 is traversed to examine ranges 420 in one or more leaf nodes such as nodes 410B or 410C. In one embodiment, map 128 includes a node 410 for each range of logical addresses that have been mapped to a corresponding range of physical addresses, but does not include nodes 410 corresponding to unmapped ranges. Thus, in such an embodiment, if a given LBA is unused, unallocated, and/or unwritten, a corresponding node 410 does not exist for that LBA in map 128. On the other hand, if an LBA has been written to, map 128 includes a node 410 specifying range 420 that includes the LBA. As such, nodes 410 may be added and/or modified when data is written to storage device 130. In such an embodiment, map 128 is also a sparse data structure, meaning that map 128 does not include mappings for an entire logical address space. Accordingly, in some embodiments, logical address space 302 may be significantly larger than physical address space 304.

Physical address mapping 430, in one embodiment, is the mapped physical addresses for a given range 420. In one embodiment, a given physical address is a composite a bank identifier for a storage bank 134, a PEB identifier for a PEB 330, a physical page identifier for a page 350, and a packet identifier for a packet 360; however in other embodiments, a physical address may be organized differently (e.g., a composite of LEB, logical-page, and ECC-chuck identifiers). In one embodiment, physical address mapping 430 is specified as a range of physical addresses. In another embodiment, physical address mapping 430 is a base address that is combined with an offset determined from the logical address. In other embodiments, mapping 430 may be specified differently.

Pointers 440, in one embodiment, identify leaf nodes 410 for a given node 410. In some embodiments, map 128 is organized such that a left pointer identifies a node 410 that has a lower address range 420 than the present node 410 and a right pointer may identify a node 410 having a higher address range 420. For example, if node 410A corresponds to the logical address range 50-100, node 410B may correspond to the range 0-50 and node 410C may correspond to the range 100-150. In some embodiments, map 128 may also be periodically balanced to give it a logarithmic access time.

Metadata 450, in one embodiment, is additional metadata that may not be used in mapping a logical address to physical address such as validity information and packet size. In one embodiment, validity information may identify whether particular locations (e.g., erase blocks, pages, or packets) store valid or invalid data. In some embodiments, metadata 450 may also include TRIM notes indicative of data that was invalidated in response to TRIM commands (in other embodiments, TRIM notes may be stored in a separate data structure within RAM 120, or on storage device 130). In some embodiments, storage device 130 may support variable packet sizes; in such an embodiment, metadata 450 may specify the size packets used for a given logical address range 420. In some embodiments, metadata 450 may also include other information such as age information, usage information (e.g., whether particular logical addresses are associated with hot or cold data), etc.

Figure 4B:
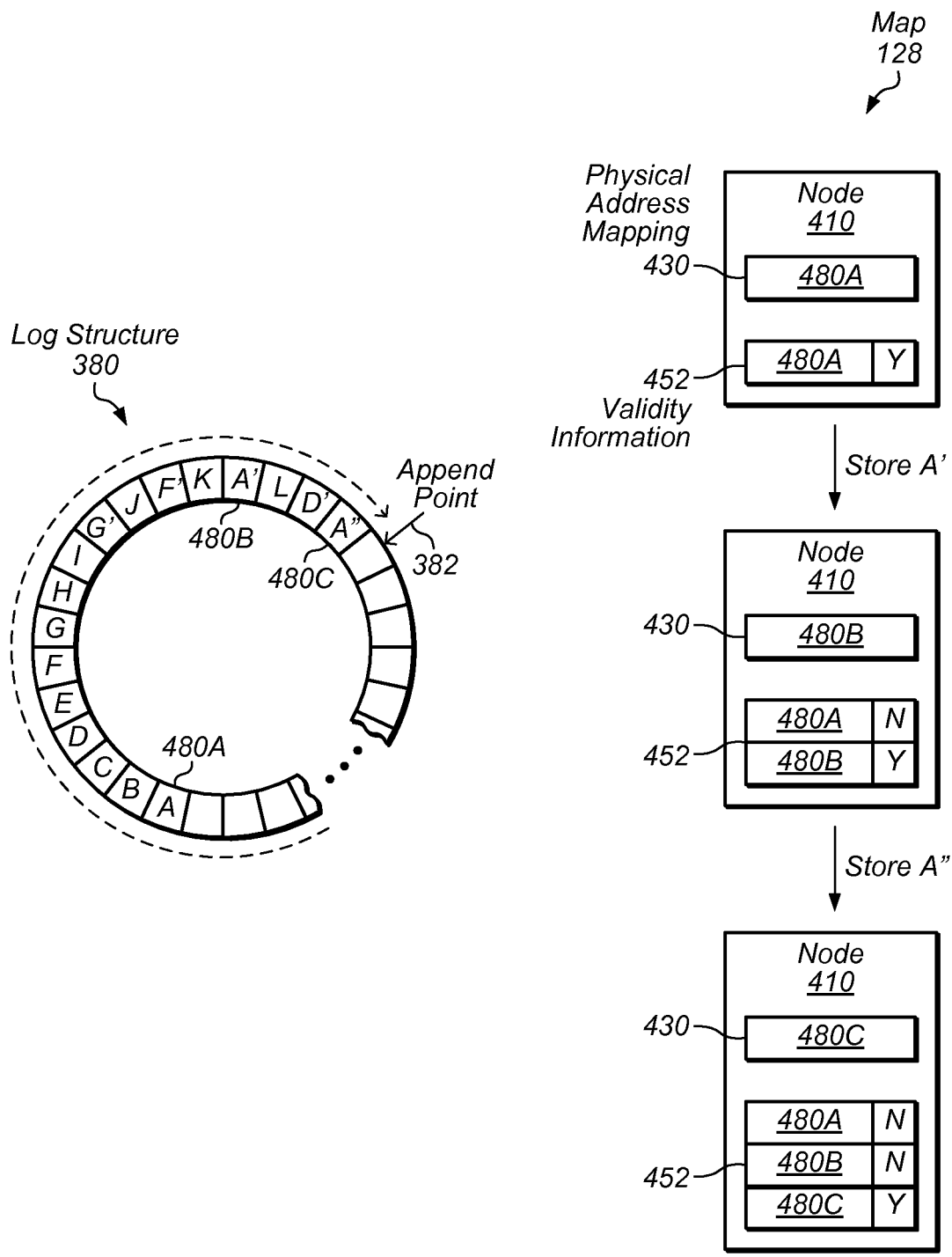
FIG. 4B depicts an exemplary usage of the map data structure.

Turning now to FIG. 4B, an exemplary usage of map 128 is depicted. In this example, the letters A-L represent various sets of data stored within log structure 380. When data A is initially written to storage device 130, it is stored at physical storage location 480A. To reflect this storage, a node 410 is added (or, in some instances, updated) in map 128. As shown, this node 410 may identify the physical address of location 480A and indicate that the data stored within that location is valid. When data A is subsequently updated (or merely moved), another instance of data A shown as A' is stored at a location 480B identified by the then current append point 382. A node 410 may then be updated (or, in some embodiments, another node 410 may be added) to reflect that the logical address for data A now maps to a physical address for location 480B; location 480A is then indicated as having invalid data. When data A is again written, another instance of data A shown as A" is stored at a location 480C. Again, a node 410 may be updated (or added) that identifies the physical address of location 480C as mapping to the logical address for data A; location 480B is also indicated as having invalid data. The previous (now invalid) instances A and A' may continue to reside in storage device 130 until the corresponding logical erase blocks 320 corresponding to locations 480A and 480B are erased (i.e., reclaimed).

Figure 5:
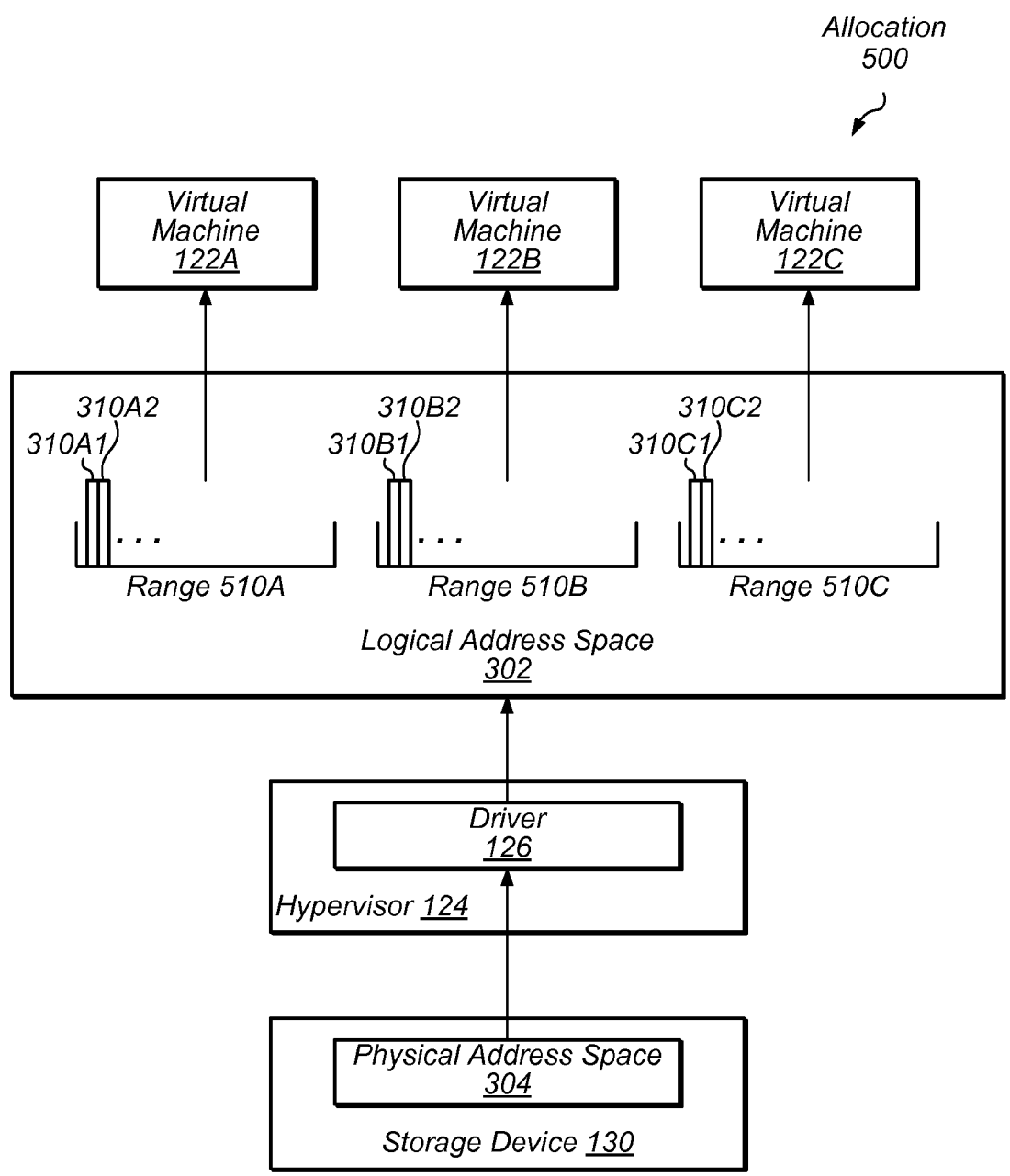
FIG. 5 is a block diagram illustrating one embodiment of an allocation of a logical address space to one or more virtual machines.

Turning now to FIG. 5, a block diagram of an allocation 500 of a logical address space is depicted. As discussed above, in various embodiments, driver 126 may present a logical address space to hypervisor 124 that it is larger than the physical address space of storage device. Hypervisor 124 may then allocate portions of the logical address space among virtual machines 122. Accordingly, in the illustrated embodiment, driver 126 presents a logical address space 302, which is allocated as ranges 510A-C to virtual machines 122A-C, respectively. In some embodiments, logical address space 302 may be significantly larger than physical address space 304 such that it constitutes a sparse address space as discussed above.

Ranges 510, in one embodiment, correspond to contiguous and non-overlapping sets of logical blocks 310 (in other embodiments, ranges 510 may be implemented differently). In one embodiment, to access data within a given block 310, a virtual machine 122 may issue a request specifying the LBA for that block 310 to driver 126, which may then translate the LBA (using map 128) to a corresponding physical address in storage device 130 and service the request. In some embodiments, however, a given virtual machine 122 (e.g., virtual machine 122A) may not be able to access logical blocks outside of its respective range 510 (e.g., blocks 310B and 310C of ranges 510B and 510C). In one embodiment, hypervisor 124 (or driver 126, in another embodiment) may enforce this restriction by denying any request from a virtual machine 122 that specifies an LBA outside of its allocated range 510. In another embodiment, hypervisor 124 may restrict access by not exposing the entirety of logical address space 302 to a virtual machine 122 and instead expose only that of its allocated range 510. Thus, a given virtual machine 122 may perceive the entirety of logical address space 302 as being its allocated range 510 (e.g., range 510A of virtual machine 122A).

Ranges 510 may be determined based on any suitable criteria. Accordingly, in some embodiments, the size of a range 510 may directly correspond to the size of physical address space 304. For example, in such an embodiment, if physical address space 304 is a 32-bit address space, range 510 is a 32-bit addressable range. In such an embodiment, a virtual machine 122 may thus perceive that it has access to the entirety of storage device 130. In another embodiment, the size of a range 510 for given a virtual machine 122 may be dependent on a virtual address space supported by a guest OS in that virtual machine 122 (as discussed with respect to FIG. 9). In some embodiments, ranges 510 are static (i.e., they do not change once they have been allocated); in other embodiments, ranges 510 are dynamic. In one embodiment, virtual machines 122 are each allocated a range 510 having the same size; however, in another embodiment, ranges 510 may have different respective sizes. For example, in one embodiment, upon instantiation, virtual machine 122A may be allocated a range 510A corresponding to 90% of space 302. When virtual machine 122B is subsequently instantiated, range 510A may be reduced to 80% of space 302, and virtual machine 122B may be allocated a range 510B corresponding to the remaining 20%. Ranges 510A and 510B may then be adjusted upon instantiation of virtual machine 122C. In some embodiments, ranges 510 may be allocated such that they collectively constitute the entirety of logical address space 302. In other embodiments, ranges 510 may correspond to only a portion of logical address space 302.

Figure 6A:
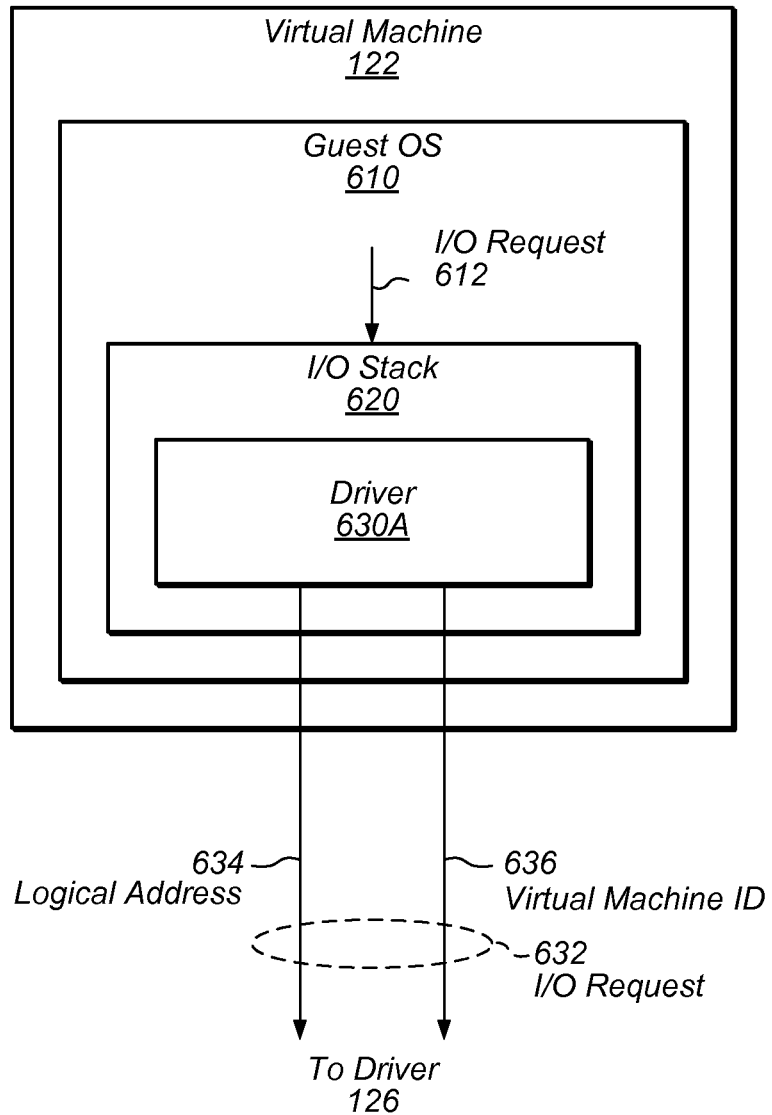
FIGS. 6A and 6B are block diagrams illustrating embodiments of a virtual machine.

Turning now to FIG. 6A, one embodiment of a virtual machine 122 is depicted. As shown, a virtual machine 122 may include a guest operation system (OS) 610 that includes an I/O stack 620. Guest OS 610 may also include a driver 630A.

Guest OS 610, in one embodiment, is executable to manage operation of virtual machine 122 including the execution of one or more applications in the virtual machine 122. As will be described with respect to FIG. 9, in one embodiment, guest OS 610 may implement a virtual memory such that it presents a virtual address space to one or more applications and translates virtual addresses specified in requests from those applications to corresponding logical addresses (shown as addresses 634). In some embodiments, guest OS 610 may maintain a swap in storage device 130 usable to store and retrieve pages evicted from RAM 120.

I/O stack 620, in one embodiment, processes a received I/O request 612 from an application in order to generate a corresponding I/O request 632 that specifies a logical address 634. Accordingly, stack 620 may include a file system layer that maintains a set of directory structures and file names to organize data. Stack 620 may include a virtual memory layer to enable support of a virtual memory such as discussed with respect to FIG. 9. Stack 620 may also include one or more driver levels to facilitate interaction with underlying virtual hardware (or physical hardware). For example, in the illustrated embodiment, driver 630A is considered as part of I/O stack 620; in other embodiments (such as the one described with respect FIG. 6B below), driver 630 may be independent of I/O stack 620.

Driver 630A, in one embodiment, is executable to interface applications and guest OS 610 with hypervisor 124 and/or driver 126. In various embodiments, this interfacing includes issuing corresponding I/O requests 632 to driver 126 on behalf of applications and OS 610. In the illustrated embodiment, a request 632 specifies both a logical address 634 and a virtual machine identifier 636. As noted above, in some embodiments, a virtual machine 122 may be given the perception that its allocated range 510 corresponds to the entirety of logical address space 302. As a result, the virtual machine 122 may be unaware of the location of its range 510 within logical address space 302 relative to other ranges 510—for example, in one embodiment, the virtual machine 122 may address the initial block within its range 510 as LBA 0 even though it has not been allocated the range 510 that includes LBA 0. To account for this, in the illustrated embodiment, driver 126 may use virtual machine identifier 636 to apply an offset to the specified logical address 634, so that the address 634 falls within the correct range 510. Thus, for example, when virtual machines 122A and 122B specify a logical address 634 of LBA 0, in such an embodiment, driver 126 will appropriately shift the addresses 634 to be within ranges 510A and 510B, respectively. Map 128 may then translate the adjusted addresses 634 to their respective physical addresses in storage device 130. (As used herein, a "relative address" is an address that is to be adjusted (e.g., based on a virtual machine identifier) to produce an "adjusted address.") It is noted that, in other embodiments, a virtual machine ID 636 may be appended to a request 632 at a stage within the I/O stack other than driver 630 such as at a stage within hypervisor 124, a stage within driver 126, a stage implemented by controller 132, etc. Still further, in other embodiments, driver 630 may be executable such that it applies the appropriate offset to a given logical address 634 before sending it to subsequent stages.

Figure 6B:
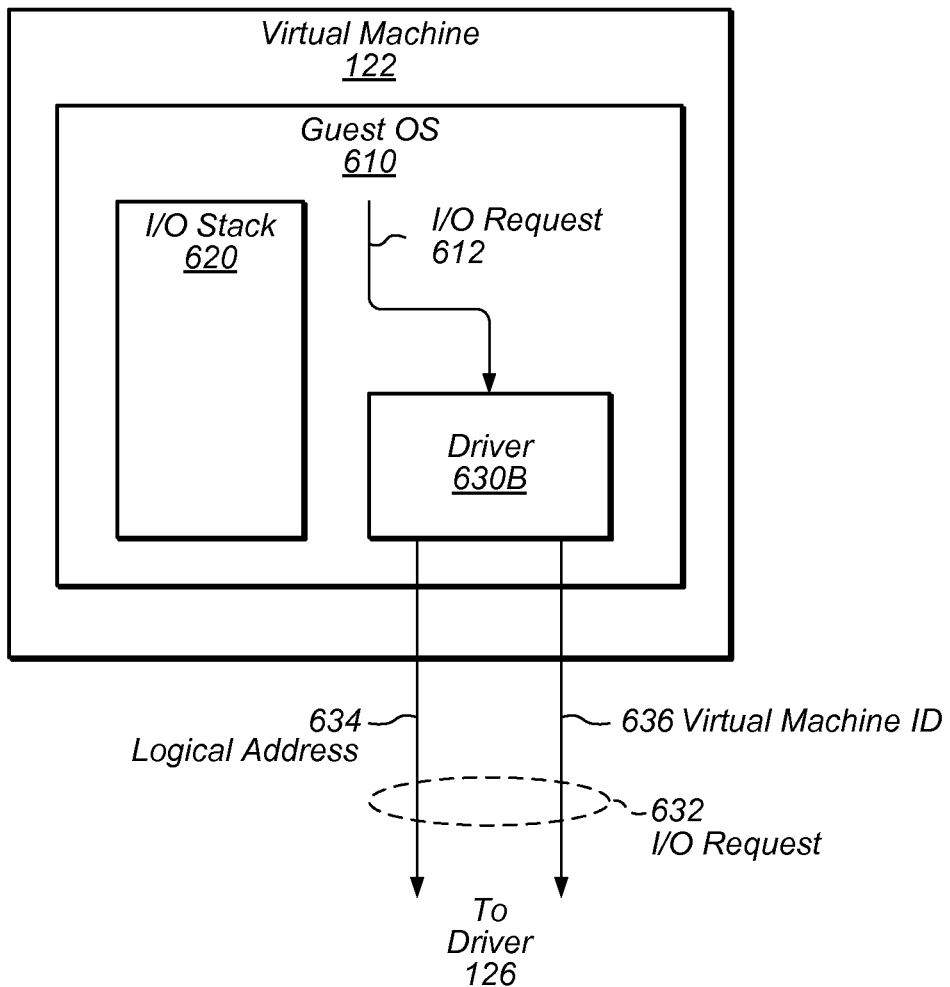

Turning now to FIG. 6B, another embodiment of a virtual machine 122 is depicted. As shown, virtual machine 122 may include a driver 630B that is independent of I/O stack 620. In such an embodiment, driver 630B may be executable to enable an application to submit requests 612 directly to driver 126 (i.e., to submit requests without traversing I/O stack 620). (In other embodiments, driver 630B may be executable to enable direct submission of requests to controller 132; in such an embodiment, driver 630 may also perform translations of logical addresses to corresponding physical addresses.) In some embodiments, enabling direct submission of requests may reduce access latency for storage device 130.

Figure 7:
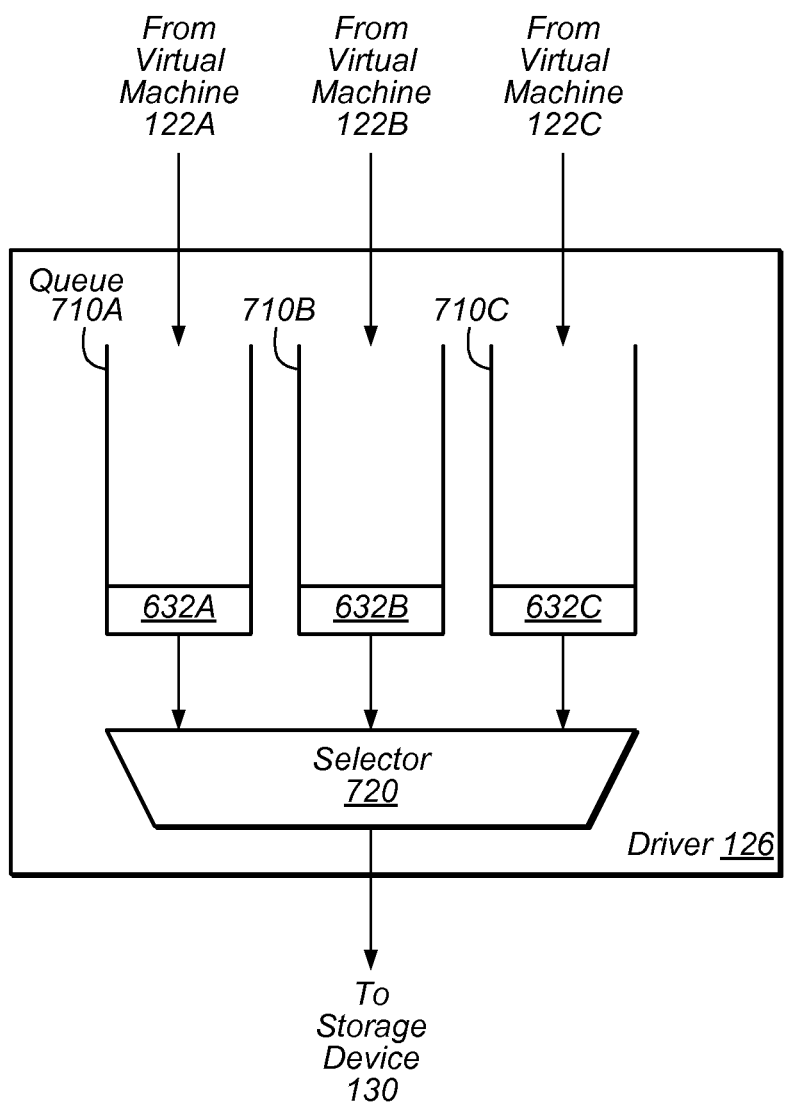
FIG. 7 is a block diagram illustrating one embodiment of a driver for the storage device.

Turning now to FIG. 7, a block diagram of driver 126 is depicted. As discussed above, in some embodiments, driver 126 implements one or more quality of service (QoS) levels for virtual machines 122 accessing storage device 130. As used herein, "quality of service" refers to some measurement relating to storage of data. For example, a quality of service might relate in some embodiments to a latency for servicing request 632 (i.e., the time between issuing a request 632 and receiving data), an amount of bandwidth given to a virtual machine (e.g., the number of requests 632 serviced for a virtual machine 122 within a given time interval), etc. A quality of service "level" refers to some desired criteria or threshold associated with a particular quality. For example, a QoS level, in certain embodiments, may specify a minimum or maximum value for a particular quality. In one embodiment, QoS levels may be assigned on a need basis—e.g., a particular virtual machine 122 that has a high I/O-latency dependence may be given a QoS level with a higher access priority than virtual machines 122 having less I/O-latency dependence. In another embodiment, QoS levels may be assigned based on the types of data being stored. In the illustrate embodiment, driver 126 implements QoS levels with queues 710A-C and selector 720.

Queues 710, in one embodiment, store received requests 632 from virtual machines 122 until they can be serviced. In the illustrated embodiment, driver 126 maintains a respective queue 710A-C for each virtual machine 122A-C. (In other embodiments, requests 632 may be allocated to queues 710 differently). Accordingly, in some embodiments, driver 126 may assign a given request 632 to an appropriate queue 710 based on its virtual machine identifier 636 and/or the specified logical address 634. In still another embodiment, each queue 710 may be associated with a respective SR-IOV virtual function. In some embodiments, each virtual function may interface with a respective one of the virtual machines 122; in another embodiment, each virtual function may be accessible to any one of the virtual machines 122. In such an embodiment, driver 126 may assign a request 632 to a queue 710 based on the virtual function through which the request 632 was received. In various embodiments, as driver 126 stores and services requests 632 in queues 710, driver 126 may track various utilization metrics usable by selector 720 to determine how to service subsequently received requests 632. In some embodiments, these metrics may be specific queues 710 such as the average number of requests 632 in a given queue 710, the average time that a request 632 awaits service in a given queue 710, the average rate at which a queue 710 receives requests 632, the time since a queue 710 was last serviced, etc. In other embodiments, driver 126 may track other metrics (which may be independent of queues 710) indicative of a virtual machine 122's utilization of storage device 130 such as an average latency for requests 632 issued by a given machine 122, given virtual machines 122's bandwidth usage of storage device 130, etc.

Selector 720, in one embodiment, services requests 632 from queues 710 in a manner that affords a quality-of-service (QoS) level to one or more of virtual machines 122. For example, in some embodiments, selector 720 may service requests 632 based on one or more metrics discussed above to achieve a desired latency for a virtual machine 122 (e.g., associated with a minimum or maximum threshold), a desired bandwidth, etc. Selector 720 may also use various other criteria for servicing queues 710 such as various queuing algorithms including first-in-first-out (FIFO) queuing, round robin queuing, priority queuing, completely fair queuing (CFQ), etc.

In various embodiments, performing scheduling of requests 632 at driver 126 (as opposed to performing scheduling in hypervisor 124) may alleviate hypervisor 124 from tracking metrics used to facilitate scheduling. In many instances, reducing hypervisor 124's involvement in this manner can reduce I/O stack traversal costs.

Figure 8:
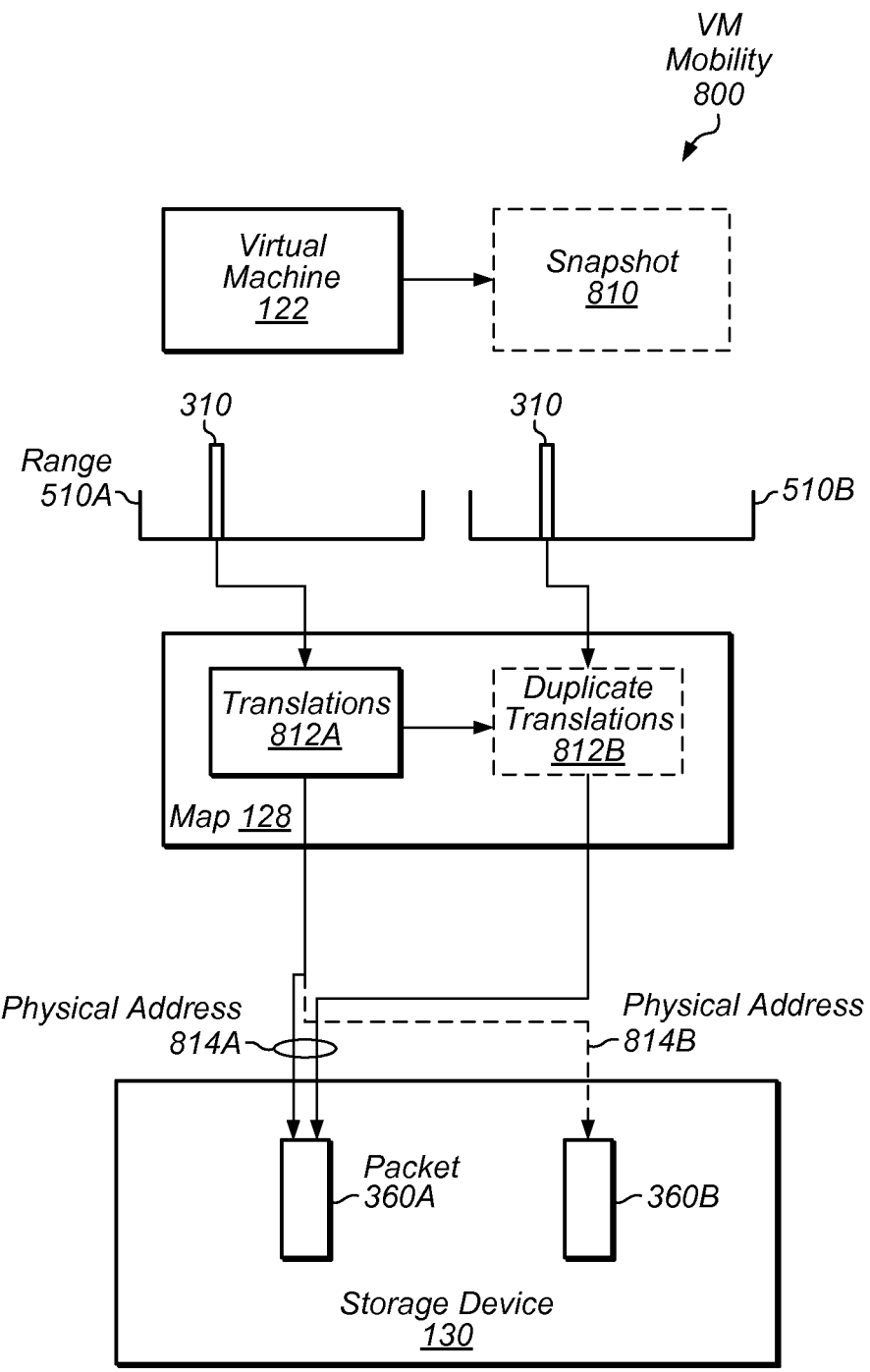
FIG. 8 is a block diagram illustrating one embodiment of virtual machine mobility.

Turning now to FIG. 8, a block diagram of virtual machine mobility 800 is depicted. As discussed above, in some embodiments, driver 126 is executable to facilitate performance of various virtual machine mobility operations such as instantiating virtual machine clones, offloading virtual machines 122 to other computing systems, backing up virtual machine state, etc. In many of these operations, driver 126 may initially create a snapshot (such as snapshot 810 show in FIG. 8) to capture the current state of a virtual machine 122. The snapshot may then be stored in a backup, instantiated as another clone virtual machine, transmitted to another computing system for instantiation, etc.

In the illustrated embodiment, driver 126 creates a snapshot 810 for a virtual machine 122 by duplicating the virtual machine's translations (shown as translations 812A) within map 128 to produce a duplicate set of translations (shown as duplicate translations 812B). Driver 126 may then allocate another range of logical address space (shown as range 510B) to the snapshot 810 and associate the duplicate set of translations with that range. For example, in one embodiment, driver 126 may subtract an offset associated with range 510A and add offset associated with range 510B to associate translations 812B with range 510B.

In one embodiment, an advantage of creating a snapshot in this manner is that it does not result in duplication of a virtual machine 122's data on storage device 130. Instead, when requests to access the same block 310 within ranges 510A and 510B are received, those requests are translated by translations 812A and 812B to the same physical address, for example, shown as physical address 814A—even though the requests specify different logical addresses associated with different ranges 510. In one embodiment, another advantage of creating a snapshot in this manner is that it may be minimally invasive as the virtual machine 122 may be permitted to continue execution. Accordingly, in such an embodiment, if the virtual machine 122 sends a request to modify the data in block 310 after snapshot 810 is created, the data is written to a new physical address, for example, shown as physical 814B rather than the original address 814A due to the log-structure of storage device 130. Thus, the data at physical address 814A remains preserved after the modification.

In some embodiments, in order to retain the data within packet 360A for snapshot 810, driver 126 may be executable to inhibit garbage collection of packet 360A after the data within packet 360A has been modified and stored within packet 360B. In one embodiment, this inhibiting may include ensuring the packet 360 is still marked as having valid data when it is copied forward. In another embodiment, garbage collection may not be performed for any packets 360 having a corresponding translation in map 128—thus, driver 126 may inhibit garbage collection by merely maintain translations 812B in map 128.

Figure 9:
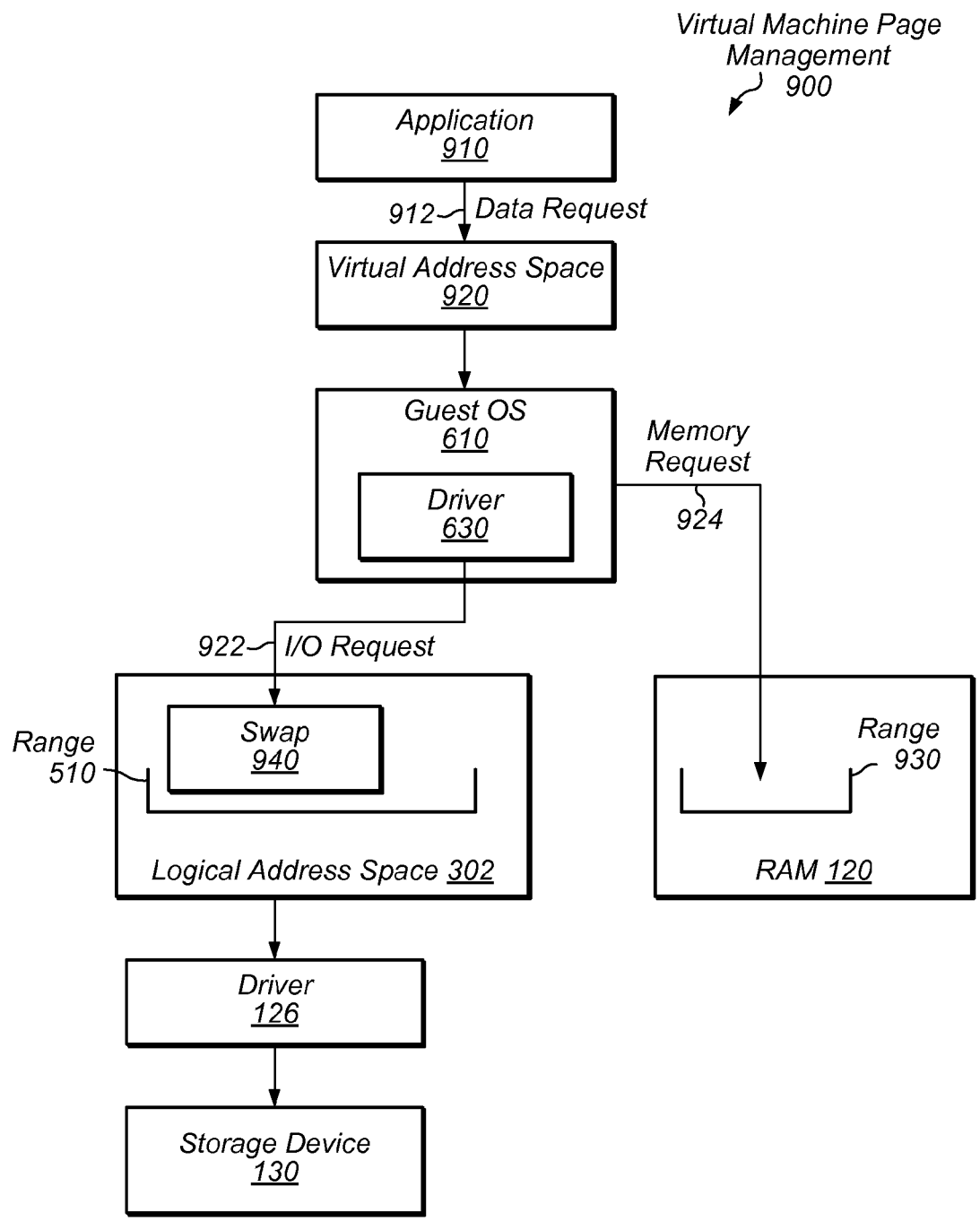
FIG. 9 is a block diagram illustrating one embodiment of virtual machine page management.

Turning now to FIG. 9, a block diagram of virtual machine page management 900 is depicted. As discussed above, in some embodiments, a guest operating system may implement a virtual memory such that it presents a virtual address space to one or more applications. In such an embodiment, driver 126 may be executable to enable the guest operating system to directly manage its swap space on storage device 130 (i.e., without using the paging capabilities of hypervisor 124 to page out data from RAM 120). Accordingly, in the illustrated embodiment, guest OS 610 presents a virtual address space 920 to application 910. In such an embodiment, driver 126 may allow guest OS 610 to store pages from RAM 120 within a swap 940 stored within storage device 130.

In one embodiment, driver 126 enables guest OS 610 to manage swap 940 by presenting a logical address space 302 that, when allocated by hypervisor 124, causes guest OS 610 to receive a range 510 that is at least as large as its virtual address space 920. For example, in one embodiment, if virtual address space 920 is a 48-bit address space, driver 126 causes hypervisor 124 to allocate a 48-bit addressable range as range 510. In such an embodiment, hypervisor 124 may also allocate a portion of RAM 120 shown as range 930. By causing guest OS 610 to be allocated a range 510 that provides full backing for virtual address space 920, driver 126 enables the guest OS 610 to evict pages from its allocated range 930 and store them in its swap 940 without relying on hypervisor 124 to monitor virtual machine accesses to RAM 120 to prevent possible collisions. Thus, when a guest OS 610 receives a data request 912 from an application 910 specifying a virtual address in virtual address space 920, guest OS 610 can appropriately translate the virtual address and issue a corresponding memory request 924 to range 930 in RAM 120 or issue a corresponding I/O request 922 to swap 940 on storage device 130 in the event of a page fault. It is noted that in such an embodiment, driver 126 may continue to monitor and schedule I/O requests (as discussed above with respect to FIG. 7) in order to prevent possible starvation from preventing the servicing of page-fault-related I/O requests such as requests 922.

Figure 10:
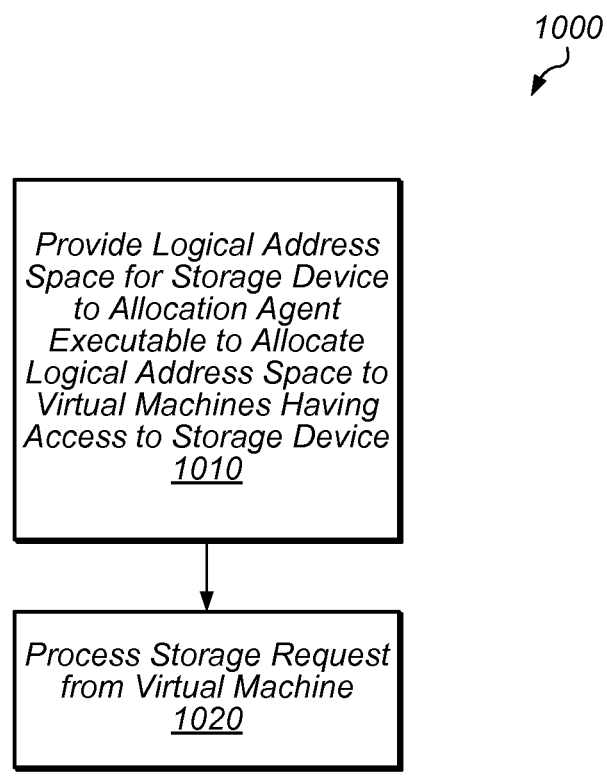
FIG. 10 is a flow diagram illustrating one embodiment of a method.

Turning now to FIG. 10, a flow diagram of a method 1000 is depicted. Method 1000 is one embodiment of a method that may be performed by an apparatus such as computing system 100 or storage device 130. Accordingly, in one embodiment, the apparatus may execute program instructions of a driver such as driver 126 to perform method 1000. In some embodiments, performance of method 1000 may reduce I/O stack traversal times for a virtual machine accessing a storage device.

In step 1010, a logical address space (e.g., space 302 discussed with respect to FIG. 5) for a storage device is provided to an allocation agent that is executable to allocate the logical address space to a plurality of virtual machines having access to the storage device. In one embodiment, the logical address space may be a sparse address space as discussed above. In some embodiments, the logical address space is determined based on a number of virtual machines on the computing system, a size of a virtual address space supported by one or more guest operating systems, a user-specified parameter, etc. In one embodiment, the allocation agent is a hypervisor executing on a computing system. In another embodiment, the allocation agent is a driver of the storage device such as driver 126. In still another embodiment, the allocation agent is an executing application. In various embodiments, each of the plurality of virtual machines is allocated a respective logical-block-address (LBA) range (e.g., ranges 510) within the logical address space.

In step 1020, a storage request (e.g., I/O request 632) from a virtual machine is processed. In such an embodiment, the storage request may specify a logical address (e.g., address 634) within the logical address space. In some embodiments, the logical address may be a relative address such that an offset is applied to the address before translating the address to its corresponding physical address. In one embodiment, the request is received for processing without traversing an I/O stack of a guest virtual machine.

Figure 11:
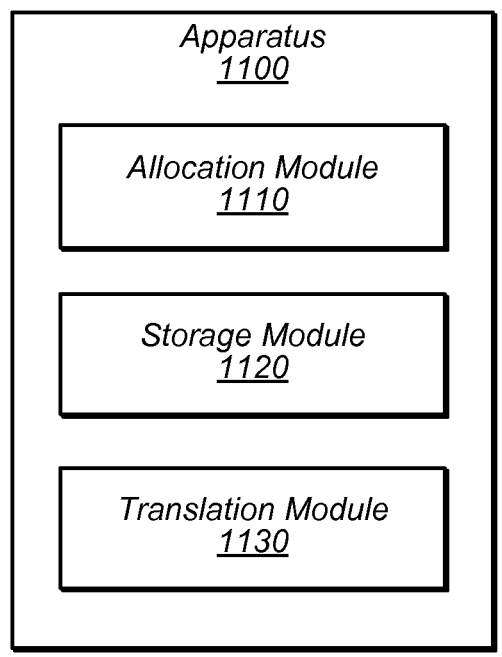
FIG. 11 is a block diagram illustrating one embodiment of an apparatus having an allocation module, a storage module, and a translation module.

Turning now to FIG. 11, a block diagram of an apparatus 1100 including modules is depicted. As used herein, the term "module" refers to circuitry configured to perform operations or a memory having program instructions stored therein that are executable by one or more processors to perform operations. Accordingly, a module may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Apparatus 1100 may include modules to implement any of the functionality described herein. For example, in the illustrated embodiment, apparatus 1100 includes an allocation module 1110, a storage module 1120, and a translation module 1130.

Allocation module 1110, in one embodiment, is configured to allocate at least a portion (e.g., ranges 510A-C collectively) of a logical address space (e.g., logical address space 302 discussed with respect to FIG. 5) for a storage device to a plurality of virtual machines managed by a hypervisor. In such an embodiment, allocation module 1110 is configured to allocate the portion by segregating the portion between the virtual machines (e.g., segregating the portion into ranges 510). In various embodiments, the logical address space may be larger than a physical address space (e.g., space 304) of the storage device. Accordingly, in one embodiment, the logical address space may be a sparse address space. In some embodiments, presentation module 1110 is configured to 1) receive an indication of a size for a virtual address space presented by a guest operating system within one of the plurality of virtual machines (e.g., virtual address space 920 presented by guest OS 610), and to present a logical address space such that a range (e.g., range 510 discussed with respect to FIG. 9) provided to the virtual machine is at least as large as the size of the virtual address space.

Storage module 1120, in one embodiment, is configured to process a storage request received directly from a virtual machine. In one embodiment the storage request includes a logical address determined by the virtual machine, and is from the allocated portion. In some embodiments, storage module 1120 may implement functionality described with respect to driver 126, storage device 130, or a combination thereof. Accordingly, in one embodiment, storage module 1120 may include ones of banks 134.

Translation module 1130, in one embodiment, is configured to translate the logical address to a physical address within the storage device. In some embodiments, the logical address is a relative logical address such that translation module 1130 translates a logical address specified by a virtual machine (e.g., logical address 634) to a corresponding physical address by applying an offset to the specified logical address based on an identifier of the virtual machine (e.g., virtual machine ID 636). In some embodiments, translation module 1130 maintains a map data structure (e.g., map 128) having a set of translations associated with a first of the plurality of virtual machines (e.g., translations 812A). In such an embodiment, apparatus 1100 may instantiate (e.g., using snapshot 810) a second virtual machine from the first virtual machine by duplicating the set of translations (e.g., duplicating translations 812A as translations 812B), associating the duplicate set of transitions with a range of the logical address space (e.g., range 510B discussed with respect to FIG. 8) allocated to the second virtual machine, and inhibiting garbage collection of the data.

In some embodiments, allocation module 1110, storage module 1120, and/or translation module 1130 are within a controller such as controller 132. In another embodiment, modules 1110, 1120, and/or 1130 may be located within a memory such as memory 120. In sum, the modules of apparatus 1100 may be implemented in any suitable manner to perform functionality described herein. Apparatus 1100 may also correspond to any suitable structure having the functionality of modules 1110-1130. In one embodiment, apparatus 1100 is a computing system that includes (or is coupled to) a storage such as storage device 130. In another embodiment, apparatus 1100 is a card including a controller (such as controller 132) and one or more storage elements (such as storage banks 134). In yet another embodiment, apparatus 1100 is a computing system including a memory system that stores modules 1110, 1120, and/or 1130.

In some embodiments, apparatus 1100 may include modules in addition to the ones shown. Accordingly, in one embodiment, apparatus 1100 may include a quality of service module configured to service requests to access the storage device in a manner that affords a quality of service level to one or more of the plurality of virtual machines. In some embodiments, the quality of service module is configured to determine to a utilization of the storage device (e.g., as discussed above with respect to FIG. 7) by the one or more virtual machines based on logical addresses specified by the requests, and to service the requests based on the determined utilization.

Figure 12A:
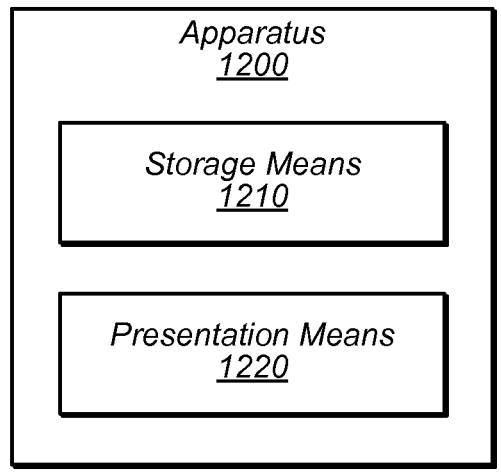
FIG. 12A is a block diagram illustrating another embodiment of an apparatus having a presentation means and storage means.

Turning now to FIG. 12A, a block diagram of an apparatus 1200 including a storage means 1210 and a presentation means 1220 is depicted. Apparatus 1200 may correspond to any suitable structure having the functionality of storage means 1210 and presentation means 1220. For example, apparatus 1200 may be any suitable type of computing device such as a server, laptop, desktop, a mobile device, etc. In some embodiments, apparatus 1200 may include multiple computing devices working together. In some embodiments, apparatus 1200 is a card including a controller (such as controller 132) and one or more storage elements (such as storage banks 134).

In various embodiments, storage means 1210 may implement any of the functionality described herein with storage device 130. Accordingly, in one embodiment, storage means 1210 is for storing data using a log-structure. Storage means 920 may correspond to any suitable structure such as those discussed above with respect to storage device 130 (e.g., one or more banks 134, computing system 100, storage system 200, etc.). Accordingly, the phrase "means for storing data using a log-structure" refers to any of the structures listed above as well as their corresponding equivalents.

In various embodiments, presentation means 1220 may implement any of the functionality described herein with respect to driver 126. Accordingly, in one embodiment, presentation means 1220 is presenting a logical address space of storage means 1210 to a hypervisor that is executable to allocate the logical address space to a plurality of virtual machines having access to the storage means 1210. In one embodiment, presentation means 1220 presents a logical address space that is larger than the physical address space of storage means 1210. In some embodiments, presentation means 1220 is configured to tracking utilizations of storage means 1210 by the plurality of virtual machines, and to enforce, based on the utilizations, a quality of service level associated with one or more of the plurality of virtual machines. In some embodiments, presentation means 1220 may also implement functionality other than that described in conjunction with driver 126.

Presentation means 1220 may correspond to any suitable structure. In one embodiment, presentation means 1220 is a hardware circuit configured to perform operations (e.g., controller 132). The hardware circuit may include, for example, custom very-large-scale integration (VLSI) circuits or gate arrays, off-the-shelf semiconductors such as logic chips, transistors, or other discrete components. Means 1220 may also be implemented in programmable hardware devices such as field programmable gate arrays, programmable array logic, programmable logic devices, or the like. In another embodiment, presentation means 1220 includes a memory having program instructions stored therein (e.g., RAM 120) that are executable by one or more processors (e.g., processor unit 110) to implement an algorithm. In one embodiment, presentation means 1220 implements the algorithm discussed with respect to FIG. 12B. In some embodiments, presentation means 1220 corresponds to presentation module 1110 and/or translation module 1120. Accordingly, the phrase "means for presenting a logical address space" refers to any of the structures listed above as well as their corresponding equivalents.

Figure 12B:
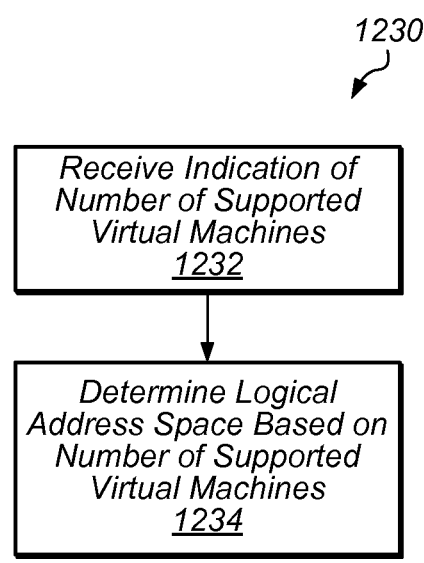
FIG. 12B is a flow diagram illustrating one embodiment of an algorithm implemented by a presentation means.

Turning now to FIG. 12B, a flow diagram illustrating an algorithm 1230 is depicted. Algorithm 1230 is one embodiment of an algorithm implemented by presentation means 1220. In the illustrated embodiment, algorithm 1230 includes, at step 1232, receiving an indication of the number of supported virtual machines. In some embodiments, step 1232 is performed during an configuration of storage means 1210 (i.e., at format of storage means 1210). In some embodiments, the indication is received from a hypervisor associated with apparatus 1200. Algorithm 1230 further includes, at step 1234, determining a logical address space for storage means 1210 based on the number of supported virtual machines. As noted above, in various embodiments, the determined logical address space may be presented to a hypervisor that is executable to allocate the logical address space to a plurality of virtual machines having access to storage means 1210.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

What is claimed is:

1. A method, comprising:
   a computing system establishing a logical address space for a storage device, and maintaining a map that associates logical addresses of the logical address space with physical storage locations of data stored on the storage device;
   the computing system allocating regions of the logical address space to respective virtual machines hosted within a virtualization environment of the computing system, wherein allocating a first region of the logical address space to a particular virtual machine comprises providing relative addresses to the particular virtual machine, each relative address corresponding to a respective logical address in the first region of the logical address space and being different from the corresponding logical address; and
   the computing system processing a storage request from the particular virtual machine, by:
      performing a first translation to determine a logical address for the storage request, the first translation based on a relative address provided to the particular virtual machine and an identifier associated with the particular virtual machine,
      performing a second translation to associate the determined logical address for the storage request in the first translation with a physical storage location on the storage device by use of the map, and
      processing the storage request at the storage device using the determined logical address for the storage request and the physical storage location associated with the determined logical address.

2. The method of claim 1, wherein providing the relative addresses to the particular virtual machine comprises exposing the first region of the logical address space to the particular virtual machine such that logical addresses other than the logical addresses within the first region are not exposed to the particular virtual machine.

3. The method of claim 2 further comprising disabling a collision prevision monitor of a hypervisor of the virtual machines.

4. The method of claim 1, wherein the relative addresses provided to the particular virtual machine are of a different size than the logical addresses of the logical address space.

5. The method of claim 4, wherein each of the relative addresses provided to the virtual machine comprises a respective logical address of the logical address space and a virtual machine identifier of the particular virtual machine.

6. The method of claim 1, wherein:
   the first translation is performed by a storage driver; and
   wherein the second translation is performed by the storage device.

7. An apparatus, comprising:
   a storage controller configured to process storage requests directed to a storage device, wherein processing the storage requests comprises associating physical addresses of data stored within the storage device with logical addresses of a logical address space, the storage controller comprising one of a circuit, a programmable logic circuit, and computer-readable instructions stored on a non-transitory storage medium;
   an allocation agent configured to allocate portions of the logical address space to virtual machines managed by a hypervisor, wherein allocating the portions comprises creating identifiers for the virtual machines, each identifier comprising a first portion and a second portion, wherein the first portion of each identifier comprises a respective logical address of the logical address space, and wherein the second portion of each identifier comprises a virtual machine identifier; and
   a virtual machine storage driver configured to:
      receive a storage request directed to the storage device from a virtual machine, the storage request associated with an identifier having a first portion and a second portion, derive a logical address from the first portion and the second portion of the identifier associated with the storage request, modify the storage request to include the derived logical address, and issue the storage request, including the derived logical address, to the storage controller, wherein, to process the storage request, the storage controller is configured to associate a physical address of data stored within the storage device with the derived logical address included with the storage request.

8. The apparatus of claim 7, wherein:

the second portion of the identifier comprises an address offset for the virtual machine; and the virtual machine storage driver is configured to derive the logical address by applying the address offset to the logical address of the first portion of the identifier.

9. The apparatus of claim 7, wherein:

the storage controller is further configured to maintain a map data structure;

the map data structure comprises translations associated with the virtual machine;

the translations are configured to associate logical addresses allocated to the virtual machine with data of the virtual machine stored on the storage device; and the virtual machine storage driver is further configured to create a snapshot of the virtual machine by:

allocating logical addresses for the snapshot, and creating translations in the map data structure configured to duplicate the translations associated with the virtual machine such that the map data structure associates the data of the virtual machine with the logical addresses allocated to the virtual machine and the logical addresses allocated for the snapshot.

10. The apparatus of claim 7, wherein the allocation agent is configured to create a set of identifiers for the virtual machine, the set including identifiers that correspond to the portion of the logical address space allocated to the virtual machine and excluding identifiers that correspond to logical addresses outside of the portion of the logical address space allocated to the virtual machine.

11. The apparatus of claim 7, wherein the virtual machine storage driver is configured to:

receive requests within a guest operating system of the virtual machine; and send the received requests directly to the storage controller, independent of one or more layers of an input/output (I/O) stack of the guest operating system.

12. The apparatus of claim 7, wherein the virtual machine storage driver is further configured to:

determine a utilization of the storage device by the virtual machine based on storage requests received from the virtual machine; and queue storage requests received from the virtual machine such that the received storage requests are sent to the storage controller for execution based on the determined utilization of the storage device by the virtual machine and quality of service level assigned to the virtual machine.

13. The apparatus of claim 7, wherein the storage device is a solid-state device.

14. An apparatus, comprising:

a first means for storing data within physical storage locations of a storage medium and for associating the physical storage locations with logical identifiers of a logical address space corresponding to the storage medium;

a second means for allocating regions of the logical address space to respective virtual machines managed by a hypervisor, wherein allocating a region of the logical address space to a virtual machine comprises providing relative addresses to the virtual machine, each relative address associated with a corresponding logical identifier of the logical address space and being different from the corresponding logical identifier; and means for identifying a storage request of the virtual machine directed to the first means, for performing a first translation to derive a logical identifier from a relative address of the identified storage request, and for sending the identified storage request and the derived logical identifier to the first means, the first means to perform a second translation to associate the derived logical identifier of the identified storage request with a physical storage location of the storage medium.

15. The apparatus of claim 14, wherein the storage medium comprises a solid-state storage array.

16. A non-transitory computer readable medium having program instructions stored thereon, wherein the program instructions are executable by a computing system to cause the computing system to perform operations, the operations comprising:

allocating a portion of a logical address space corresponding to a storage device to a virtual machine of one or more virtual machines operating on a computing device, wherein allocating the portion comprises providing relative addresses to the virtual machine, each relative address corresponding to a logical address within the portion of the logical address space and being different from the corresponding logical address; and servicing a storage request from the virtual machine, by:

performing a first translation to determine a logical address for the storage request from a relative address associated with the storage request, performing a second translation to map the determined logical address to a storage address of the storage device, and associating the determined logical address with the storage address in a map, the map associating logical addresses of the logical address space with physical storage locations of data stored on the storage device.

17. The computer readable medium of claim 16, the operations further comprising allocating respective portions of the logical address space to each of the one or more virtual machines, wherein the respective portions comprise contiguous and non-overlapping ranges of logical addresses of the logical address space.

18. The computer readable medium of claim 16, wherein servicing the storage request from the virtual machine further comprises:

identifying the virtual machine associated with the storage request; and determining the quality of service level for the storage request based on a quality of service level assigned to the identified virtual machine.

19. The computer readable medium of claim 16, the operations further comprising monitoring storage requests submitted for execution to the storage device to determine a utilization of the storage device by the virtual machine, wherein servicing the storage request from the virtual machine further comprises:

assigning the storage request to one of a plurality of request queues, each request queue configured to hold storage requests of a respective virtual machine, and selecting the storage request from the assigned request queue based on the determined utilization of the storage device by the virtual machine.

20. The computer readable medium of claim 16, wherein servicing the storage request from the virtual machine further comprises:

determining a quality of service level for the storage request, queuing the storage request in a request queue, the request queue holding storage requests to await submission to the storage device, selecting the storage request for submission to the storage device, wherein the storage request is selected from the storage requests stored in the request queue in accordance with the determined quality of service level for the storage request, and sending the storage request to the storage device in response to selecting the storage request from the request queue.

21. The computer readable medium of claim 16, wherein the program instructions comprise program instructions of a driver for the storage device.

\* \* \* \* \*